United States Patent
Cho et al.

(10) Patent No.: US 11,719,811 B2
(45) Date of Patent: Aug. 8, 2023

(54) METHOD AND DEVICE TO IMPROVE RADAR DATA USING REFERENCE DATA

(71) Applicant: Samsung Electronics Co., Ltd., Suwon-si (KR)

(72) Inventors: Hyunwoong Cho, Seoul (KR); Jong-Sok Kim, Hwaseong-si (KR); Sungdo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 16/912,250

(22) Filed: Jun. 25, 2020

(65) Prior Publication Data

US 2021/0149041 A1    May 20, 2021

(30) Foreign Application Priority Data

Nov. 20, 2019    (KR) ........................ 10-2019-0149338

(51) Int. Cl.

| | |
|---|---|
| *G01S 13/931* | (2020.01) |
| *G01S 7/04* | (2006.01) |
| *G01S 13/87* | (2006.01) |
| *G01S 13/89* | (2006.01) |
| *G06T 3/40* | (2006.01) |
| *G06N 20/00* | (2019.01) |
| *G06N 3/08* | (2023.01) |

(52) U.S. Cl.
CPC .............. *G01S 13/931* (2013.01); *G01S 7/04* (2013.01); *G01S 13/872* (2013.01); *G01S 13/89* (2013.01); *G06T 3/4046* (2013.01); *G06N 3/08* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,989,519 | B2 | 3/2015 | Irani et al. |
| 10,373,019 | B2 | 8/2019 | Nariyambut Murali et al. |
| 2016/0334502 | A1 | 11/2016 | Ali et al. |
| 2017/0300765 | A1* | 10/2017 | Dojcinovic ............. G06T 7/254 |
| 2018/0075581 | A1 | 3/2018 | Shi et al. |
| 2018/0122048 | A1 | 5/2018 | Wang et al. |
| 2018/0293706 | A1 | 10/2018 | Viswanathan et al. |
| 2018/0341333 | A1* | 11/2018 | Molchanov .......... G06K 9/6267 |

(Continued)

FOREIGN PATENT DOCUMENTS

DE    10 2020 100286 A1    8/2020

OTHER PUBLICATIONS

T. Eder, R. Hachicha, H. Sellami, C. van Driesten and E. Biebl, "Data Driven Radar Detection Models: A Comparison of Artificial Neural Networks and Non Parametric Density Estimators on Synthetically Generated Radar Data," 2019 Kleinheubach Conference, 2019, pp. 1-4. (Year: 2019).*

(Continued)

*Primary Examiner* — Whitney Moore
(74) *Attorney, Agent, or Firm* — NSIP Law

(57) ABSTRACT

A method with radio detection and ranging (radar) data processing may include: obtaining, by a radar sensor, input radar data; and generating, using a resolution increase model, output radar data from the input radar data and reference data, wherein the output radar data has a resolution greater than a resolution of the input radar data.

23 Claims, 18 Drawing Sheets

(56) References Cited

U.S. PATENT DOCUMENTS

2019/0004533 A1 1/2019 Huang et al.
2019/0173196 A1* 6/2019 Achour ................ G01S 13/426
2020/0249314 A1* 8/2020 Eshet .................... G01S 13/931
2020/0292388 A1* 9/2020 Chen .................... G06K 9/6257

OTHER PUBLICATIONS

Eder, Thomas, et al. "Data Driven Radar Detection Models: A Comparison of Artificial Neural Networks and Non Parametric Density Estimators on Synthetically Generated Radar Data." 2019 Kleinheubach Conference. IEEE, 2019. (4 pages in English).
Armanious, Karim, et al. "An adversarial super-resolution remedy for radar design trade-offs." 2019 27th European Signal Processing Conference (EUSIPCO). IEEE, 2019. (5 pages in English).
Lekic, Vladimir, and Zdenka Babic, "Automotive radar and camera fusion using Generative Adversarial Networks." Computer Vision and Image Understanding 184 (2019): 1-8. (8 pages in English).
Extended European search Report dated Mar. 18, 2021 in counterpart EP Application No. 20198414.3 (9 pages in English).

* cited by examiner

METHOD AND DEVICE TO IMPROVE RADAR DATA USING REFERENCE DATA

CROSS-REFERENCE TO RELATED APPLICATIONS

This application claims the benefit under 35 USC § 119(a) of Korean Patent Application No. 10-2019-0149338 filed on Nov. 20, 2019, in the Korean Intellectual Property Office, the entire disclosure of which is incorporated herein by reference for all purposes.

BACKGROUND

1. Field

The following description relates to technology for improving a radio detection and ranging (radar) resolution.

2. Description of Related Art

Advanced driver assistance systems (ADAS) are used to enhance safety and convenience for drivers by implementing sensors provided inside or outside a vehicle. The ADAS may assist a driver by detecting objects and alerting the driver of hazardous road conditions.

The sensors used for ADAS may include a camera, an infrared sensor, an ultrasonic sensor, a light detection and ranging (lidar) sensor, or a radio detection and ranging (radar) sensor. Among these sensors, the radar sensor may reliably measure an object present adjacent to a vehicle without being affected by environmental conditions including, for example, weather, compared to optical sensors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with radio detection and ranging (radar) data processing includes: obtaining, by a radar sensor, input radar data; and generating, using a resolution increase model, output radar from the input radar data and reference data, wherein the output radar data has a resolution greater than a resolution of the input radar data.

The obtaining of the input radar data may include generating an input radar image from the input radar data. The generating of the output radar data may include: generating input data by concatenating, to the generated input radar image, a reference radar image as the reference data, the reference radar image having a resolution greater than a resolution of the input radar image; and generating, from the generated input data, an output radar image as the output radar data, using the resolution increase model.

The reference data may include radar data obtained, before the input radar data is obtained, by another radar sensor having a resolution greater than a resolution of the radar sensor.

The reference data may further include radar data obtained by another radar sensor having a field of view (FOV) overlapping at least a portion of a FOV of the radar sensor.

The generating of the output radar data may include: identifying an environment around a radar data processing device performing the method; and obtaining, as the reference data, environmental reference data corresponding to the identified environment from a reference database.

The obtaining of the reference data may include receiving the environmental reference data from an external database of the radar data processing device.

The method may further include: obtaining additional radar data collected by another radar sensor; and generating the reference data from the obtained additional radar data. The radar sensor and the other radar sensor may be disposed in a same moving object.

The other radar sensor may have a field of view (FOV) overlapping at least a portion of a FOV of the radar sensor.

The obtained additional radar data may include data collected in a previous time frame, and sharing a FOV of the radar sensor and at least a portion of a scene in a current time frame.

The obtained additional radar data may include data collected in a previous time frame, and including an object detected through the radar sensor in a current time frame.

The generating of the output radar data may include: extracting input feature data from the input radar data using a portion of layers of the resolution increase model; and generating the output radar data from the extracted input feature data and reference feature data using another portion of the layers of the resolution increase model.

The generating of the output radar data using the other portion of the layers may include: concatenating the reference feature data to the input feature data before the obtaining of the input radar data; and generating, using the other portion of the layers of the resolution increase model, the output radar data from data in which the reference feature data and the input feature data are concatenated.

The method may further include: obtaining the reference data based on any one or any combination of any two or more of an infrared sensor, an image sensor, and a light detection and ranging (lidar) sensor that is arranged based on a reference coordinate system common to the radar sensor.

The obtaining of the reference data may include detecting and classifying an object from the reference data. The generating of the output radar data may include generating the output radar data from the input radar data and the reference data along with a result of the classifying of the object, using the resolution increase model.

The method may further include: generating, based on the output radar data, result data including any one or any combination of any two or more of a detection result, a tracking result, a recognition result, a map of a surrounding area, and an output scan image. The detection result, the tracking result, the recognition result, the map, and the output scan image may be associated with an object disposed adjacent to a radar data processing device performing the method.

The method may further include: visualizing the result data through a display.

The method may further include: changing, based on result data obtained from the output radar data, any one or any combination of any two or more of a speed, an acceleration, and a steering of a vehicle in which a radar data processing device performing the method is disposed.

The obtaining of the input radar data may include: sensing, as the input radar data, radar data associated with at least a portion of a body of a user; and indicating a recognition result of recognizing, based on the output radar data, any one or any combination of any two or more of a gesture of the user, a body part of the user, and an identity of the user.

In another general aspect, a non-transitory computer-readable storage medium stores instructions that, when executed by a processor, cause the processor to perform the method described above.

In another general aspect, a device with radio detection and ranging (radar) data processing includes: a radar sensor configured to obtain input radar data by transmitting and receiving a radar signal; and a processor configured to generate, using a resolution increase model, output radar data from the input radar data and reference data. The output radar data may have a resolution greater than a resolution of the input radar data.

Other features and aspects will be apparent from the following detailed description, the drawings, and the claims.

Figure 1:
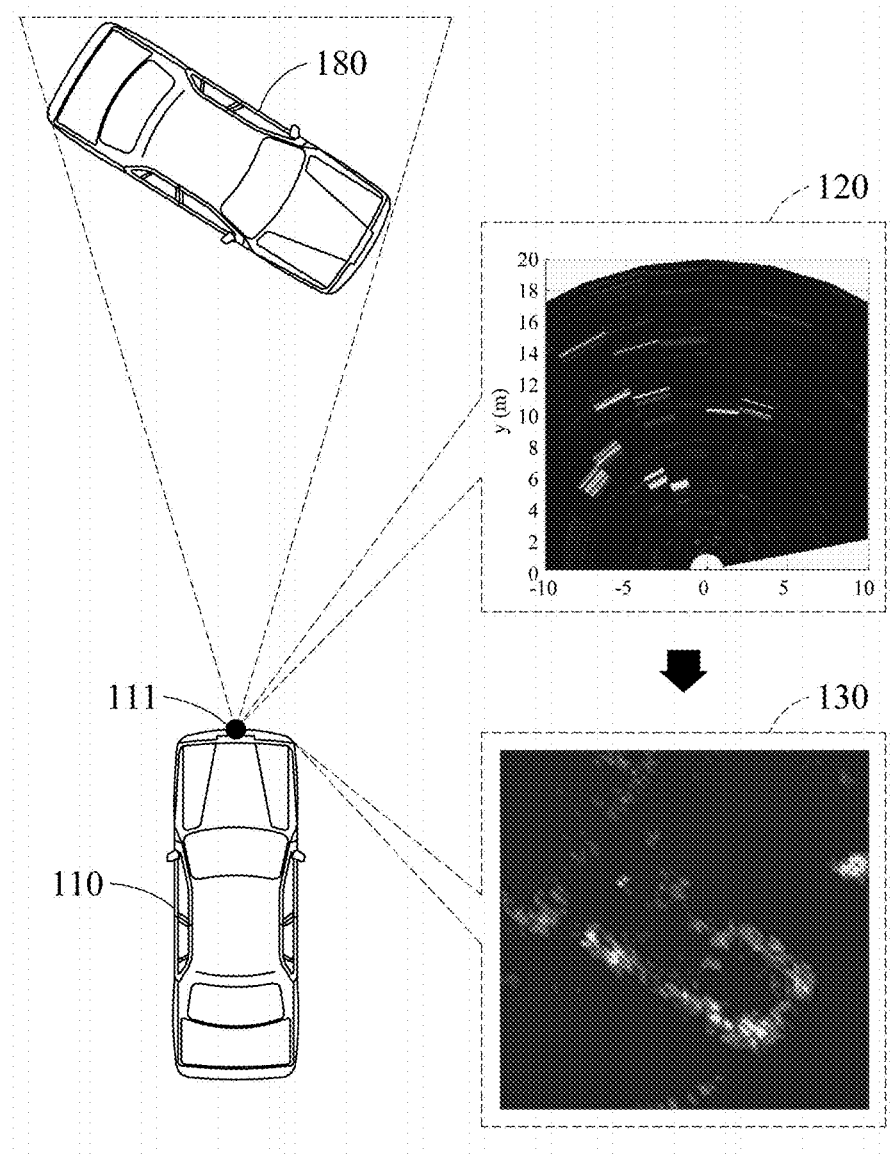
FIG. 1 illustrates an example of recognizing a surrounding environment through a radio detection and ranging (radar) data processing method, according to an embodiment.

Throughout the drawings and the detailed description, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application may be omitted in the interest of conciseness.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of recognizing a surrounding environment through a radio detection and ranging (radar) data processing method, according to an embodiment.

In the example of FIG. 1, a radar data processing device 110 may detect an object present in front of the radar data processing device 110 through a sensor configured to detect the object. The sensor may be, for example, an image sensor, a light detection and ranging (lidar) sensor, or a radar sensor. For example, it is possible to detect a distance to an object 180 present in front, an angle formed with the object 180, a velocity of the object 180, and the like, through the sensor FIG. 1 illustrates an example where the sensor is a radar sensor 111. In the example of FIG. 1, the radar data processing device 110 may analyze a radar signal received from the radar sensor 111 and detect a distance to the object 180 located in front of the radar sensor 111. The radar sensor 111 may be disposed inside or outside the radar data processing device 110. The radar sensor 111 may radiate the radar signal towards an outside of the radar data processing device 110. The radar data processing device 110 may detect the distance to the object 180 based on data collected by another sensor, for example, an image sensor or the like, in addition to the radar signal received from the radar sensor 111. The term "distance" used herein may indicate a range, and the terms "range" and "distance" may thus be interchangeably used herein. For example, a range from A to B may indicate a distance from A to B, and a range between A and B may indicate a distance between A and B.

The radar data processing device 110 may be provided in a vehicle, for example. The vehicle may perform an operation, for example, adaptive cruise control (ACC), autonomous emergency braking (AEB), blind spot detection (BSD), and/or the like, based on the distance or the range detected by the radar data processing device 110.

Further, the radar data processing device 110 may generate a map 130 of an environment therearound in addition to detecting a range. The map 130 may be a map indicating locations of targets located around the radar data processing device 110, and such nearby targets may include, for example, dynamic objects such as vehicles and human beings, and stationary or background objects such as guardrails and traffic lights.

A single scanning technique may be used to generate the map 130. Through the single scanning technique, the radar data processing device 110 may obtain a single scan image 120 from the radar sensor 111 and generate the map 130 from the obtained single scan image 120. The single scan image 120 may be generated from a radar signal sensed by the single radar sensor 111, and may have a relatively low resolution. The single scan image 120 may be a radar scan image, and may include ranges indicated by radar signals received from an elevation angle by the radar sensor 111. For example, a horizontal axis of the single scan image 120 in the example of FIG. 1 indicates a steering angle of the radar sensor 111, and a vertical axis of the single scan image 120 indicates a range from the radar sensor 111 to a target. A single scan image is not limited to the example format illustrated in FIG. 1, and may be represented by another format in various examples.

A radar scan image may be mainly described herein as a two-dimensional (2D) image map such as a range-Doppler map or a range-angle map, but is not limited to the example 2D maps. The radar scan image may be a map of a three-dimensional (3D) or higher-dimensional format such as a range-Doppler-angle map. In addition, the steering angle may indicate an angle corresponding to a direction from the radar data processing device 110 towards a target point. For example, the steering angle may be an angle between a direction in which the radar data processing device 110 proceeds and the target point based on the radar data processing device 110, for example, the vehicle. The range-Doppler map may indicate a Doppler velocity of a target and a range from the radar sensor 111 to the target. For example, one axis of the range-Doppler map indicates a Doppler velocity, for example, a radial velocity, and another axis of the range-Doppler map indicates a range. Similarly, the range-angle map may indicate a direction-of-arrival (DoA) corresponding to a target and a range from the radar sensor 111 to the target. For example, one axis of the range-angle map indicates a DoA and another axis of the range-angle map indicates a range.

The radar data processing device 110 may obtain accurate information about a shape of a target through a multi-radar map. The multi-radar map may be generated by combining or concatenating a plurality of radar scan images. For example, the radar data processing device 110 may generate the map 130 by spatiotemporally combining or concatenating multiple radar scan images obtained as the radar sensor 111 moves.

As described above, the radar data processing device 110 may generate a scan image by processing raw radar data generated from a radar signal, and generate traveling or driving related information, for example, the map 130, or perform object recognition, based on the generated scan image. Here, a high-resolution scan image may be needed to improve accuracy in generating the traveling related information and performing the object recognition. The term "resolution" used herein may indicate a measure of how detailed an image is represented, and a total pixel count in the image. The term "resolving power unit" used herein may indicate a minimum unit of a capability of a device, for example, a sensor and a radar, to identify a small difference, for example, a capability to discriminate two objects located separately from each other. The minimum unit may include, for example, a minimum range unit, a minimum angle unit, and a minimum velocity unit. The resolution may be inversely proportional to the resolving power unit and/or resolving power. Thus, as a resolving power unit of a device decreases and is thus improved, a higher-resolution image may be obtained.

However, due to a limitation in terms of a cost for a radar sensor and the number of radar sensors that may be provided in a vehicle, an amount of information of raw radar data that is obtainable by a single radar sensor may be restricted. Since the amount of information of raw radar data obtained by a single radar senor may be restricted, a resolution of a scan image generated from the raw radar data may also be restricted.

Figure 2:
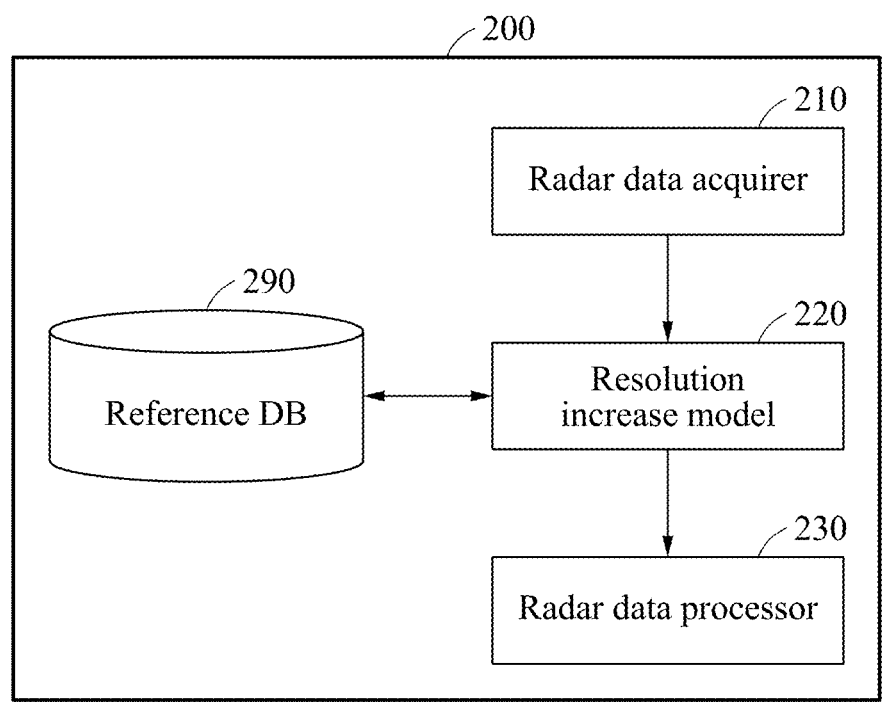
FIG. 2 illustrates an example of a radar data processing device, according to an embodiment.

FIG. 2 illustrates an example of a radar data processing device 200, according to an embodiment.

Referring to FIG. 2, the radar data processing device 200 includes, for example, a radar data acquirer 210, a resolution increase model 220, a radar data processor 230, and a reference database (DB) 290. The radar data acquirer 210 and the radar data processor 230 may be embodied by a software module, but are not limited thereto, and may also be embodied by a hardware module or a combination of the software module and the hardware module.

The radar data acquirer 210 may obtain radar data. For example, the radar data acquirer 210 may include a radar sensor configured to obtain raw radar data by transmitting and receiving a radar signal. The radar sensor will be described in greater detail with reference to FIG. 3. The raw radar data may include information corresponding to a plurality of dimensions. For example, the raw radar data may include information associated with a range-related dimension, a horizontal angle-related dimension, an elevation angle-related dimension, and a radial velocity-related dimension. In this example, in discussing angles, a horizontal angle will be mainly described. However, the disclosure is not limited to such an example. In addition, dimensions of radar data are not limited to three dimensions. That is, dimensions of radar data are not limited to a range dimension, an angular dimension, and a radial velocity dimension described herein.

Figure 3:
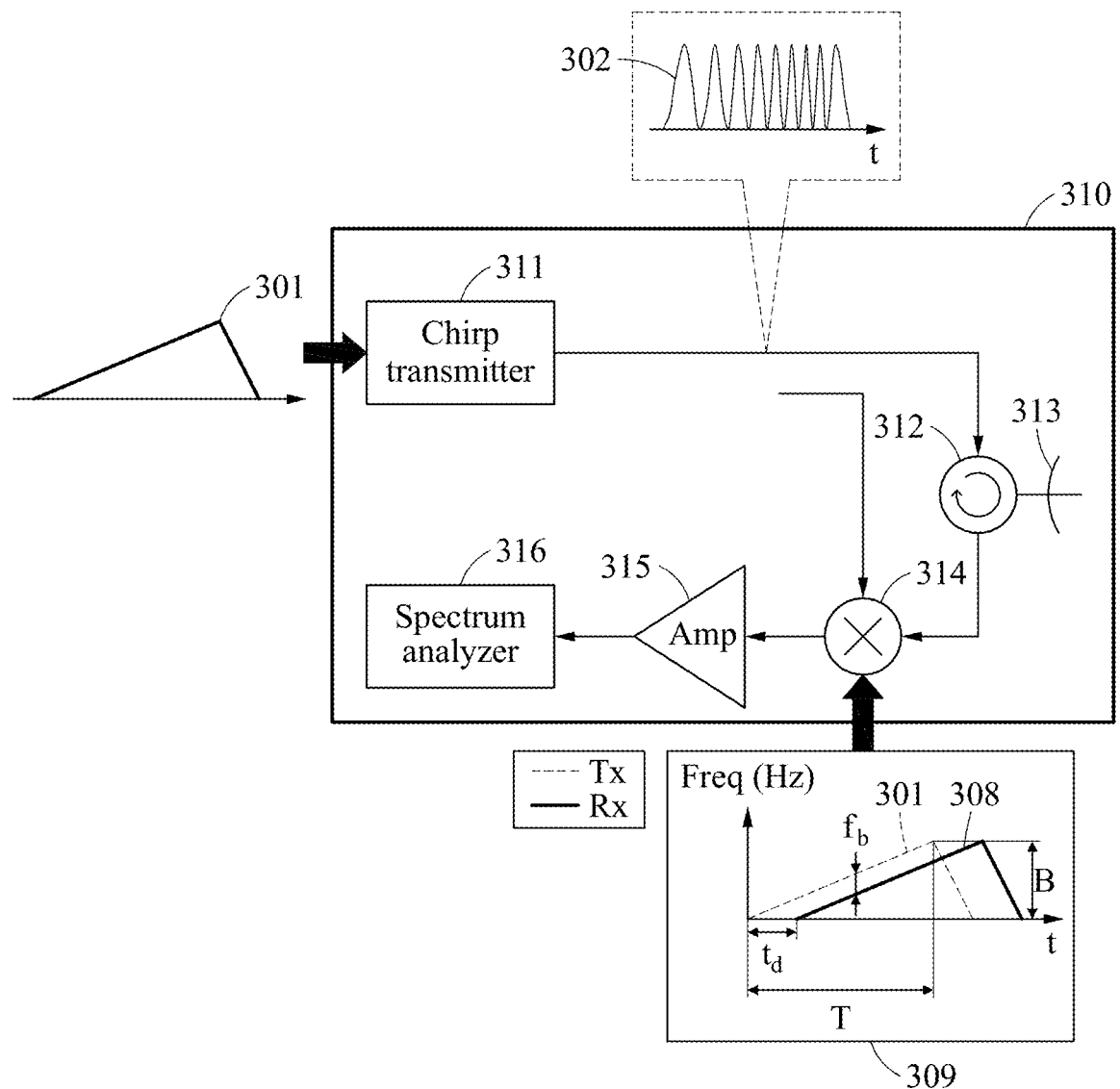
FIG. 3 illustrates an example of a radar sensor, according to an embodiment.

The range dimension may indicate a change in frequency of a chirp signal. The frequency change of the chirp signal may indicate information on a fast time axis, and a range between the radar sensor and an object may be calculated from a frequency difference between a transmitted signal and a corresponding received signal in the radar sensor. For example, the fast time axis may be a time axis on which a frequency change of each chirp signal is indicated as illustrated in FIG. 3.

The angular dimension may indicate a change in virtual antennas. For example, the radar sensor may use a plane wave and may be provided in a structure of a uniform linear array (ULA). In this example, a radar signal transmitted from a transmitting antenna may be received by a plurality of receiving antennas. Neighboring receiving antennas may be disposed separately from each other at intervals, and thus the receiving antennas may receive signals having different phases in response to the corresponding signal radiated from the same transmitting antenna. The radar data processing device 200 may estimate a DoA based on such a phase difference.

The radial velocity dimension may indicate information on a slow time axis, as information associated with a change among a plurality of chirp signals. For example, when an object moves, a plurality of chirp signals to be successively reflected and received from the object may change in phase, and information associated with such phase change of the chirp signals may be used to estimate a radial velocity of the object. For example, the slow time axis may be a time axis classified by chirp signals as illustrated in FIG. 3.

The radar data acquirer 210 may obtain the radar data by processing the raw radar data. For example, the radar data acquirer 210 may generate a radar scan image by preprocessing the raw radar data. For example, a radar scan image map may indicate information associated with some of a plurality of dimensions of the raw radar data. For example, the radar scan image map may be a 2D format map such as, for example, a range-Doppler map or a range-angle map. For example, when the radar data is the radar scan image, a resolution of the radar scan image may correspond to the number of pixels included in the radar scan image.

Although radar data may be described herein mainly as a radar scan image, radar data is not limited to a scan image. The radar data may include the raw radar data sensed by the radar sensor and/or data obtained through conversion from the raw radar data. A resolution of the raw radar data may be inversely proportional to range resolving power, angle resolving power, and velocity resolving power of the radar sensor that senses the raw radar data. For example, the range resolving power may be inversely proportional to a bandwidth that is swept by a chirp signal. That is, as the bandwidth increases, the range resolving power may be improved and the improved range resolving power may be provided. In addition, as the number of virtual antennas included in the radar senor increases, the angle resolving power may be improved and thus accuracy in DoA estimation may be improved. This is because, when estimating a DoA through digital beamforming (DBF) and other DoA estimation methods, an angular resolution may be inversely proportional to the total number of virtual antennas. For example, the number of virtual antennas may correspond to a product of a multiplication of the number of transmitting antennas and the number of receiving antennas. When periods of chirp signals are the same and a greater number of chirp signals are used for single scanning, the velocity resolving power in the radar data may be improved. An example limitation on resolving power based on hardware performance of the radar sensor will be described with reference to FIG. 3. However, a resolution and resolving power of the radar sensor may not be limited to such an example.

The resolution increase model 220 may be designed to increase a resolution of input radar data, and have a machine learning structure and include a neural network. The resolution increase model 220 may be configured to output second-resolution output data from first-resolution input data and reference data. Here, a second resolution of the second-resolution output data may be greater than, or higher than, a first resolution of the first-resolution input data. The second resolution may indicate a high resolution and the first resolution may indicate a low resolution. Thus, the first-resolution input data may be low-resolution input data, and the second-resolution output data may be high-resolution output data. An example structure of the resolution increase model 220 will be described hereinafter with reference to FIG. 4.

In an example, the radar data processing device 200 may generate output radar data from input radar data and reference data, using the resolution increase model 220. The radar data processing device 200 may load, from the reference DB 290, the reference data used to increase a resolution of the input radar data. The radar data processing device 200 may store the reference DB 290 in advance, or request and receive the reference DB 290 as needed through communication with an external server. The reference DB 290 may be updated through replacement of an external memory card. The reference data described herein may be data to which the resolution increase model 220 refers in order to generate high-resolution output radar data from the input radar data, and may include raw radar data, a radar scan image, feature data extracted from radar data, and additional information obtained by various types of sensors other than the radar sensor. The radar scan image and the feature data will be described in detail hereinafter.

The radar data processor 230 may process the output radar data generated using the resolution increase model 220 as described above. For example, the radar data processor 230 may convert the output radar data to information associated with an actual range to an individual object, a radial velocity, and an angle, and control a vehicle and/or a mobile terminal in which the radar data processing device 200 is provided using the information obtained through the converting. Although the radar data acquirer 210 is described above as generating the radar scan image as the input radar data from the raw radar data, the disclosure is not limited to this example. For example, the radar data acquirer 210 may obtain raw radar data as input radar data, and generate output radar data from the raw radar data using the resolution increase model 220. In this example, the radar data processor 230 may convert the output radar data to an output radar scan image. For another example, the radar data acquirer 210 may generate intermediate input data by applying, to raw radar data, a portion of preprocessing operations, and generate high-resolution intermediate output data from the intermediate input data using the resolution increase model 220. In this example, the radar data processor 230 may generate an output radar scan image by applying, to the intermediate output data, a remaining portion of the preprocessing operations.

FIG. 3 illustrates an example of a radar sensor, in accordance with one or more embodiments.

Referring to FIG. 3, a radar sensor 310 radiates a signal through an antenna 313 and receives a signal through the antenna 313. The signal radiated by the radar sensor 310 and the signal received by the radar sensor 310 may also be referred to as radar signals. The radar sensor 310 may be, for example, a millimeter wave (mmWave) radar, and may estimate a range to an object by analyzing a time of flight (ToF), which is an amount of time taken for a radiated electric wave to return after striking on the object, and may further estimate a change in signal waveform. The radar sensor 310 may be embodied as, for example, a frequency-modulated continuous-wave (FMCW) radar sensor, but is not limited to an FMCW sensor.

For example, a chirp transmitter 311 of the radar sensor 310 may generate a frequency-modulated (FM) signal 302 of which a frequency changes over time. For example, the chirp transmitter 311 generates the FM signal 302 by performing frequency modulation on a chirp signal 301. The chirp signal 301 is a signal of which an amplitude increases or decreases linearly over time. The chirp transmitter 311 generates the FM signal 302 having a frequency corresponding to an amplitude of the chirp signal 301. For example, as illustrated in FIG. 3, the FM signal 302 has a waveform of which a frequency increases gradually in an interval in which an amplitude of the chirp signal 301 increases, and a waveform of which a frequency decreases gradually in an interval in which an amplitude of the chirp signal 301 decreases. However, a form of the chirp signal 301 is not limited to the illustrated example. The chirp transmitter 311 transmits the FM signal 302 to a duplexer 312 of the radar sensor 310.

The duplexer 312 determines a transmission path and a reception path of a signal through the antenna 313. For example, while the radar sensor 310 is radiating the FM signal 302, the duplexer 312 forms a signal path from the chirp transmitter 311 to the antenna 313, and transmits the FM signal 302 to the antenna 313 through the formed signal path and then radiates the signal externally.

While the radar sensor 310 is receiving a signal reflected from an object, the duplexer 312 forms a signal path from the antenna 313 to a spectrum analyzer 316. The antenna 313 receives a reflected signal 308 that is returned to the antenna 313 as a result of the radiated signal FM signal 302 that is transmitted from the antenna 313 arriving at the object, and then being reflected from the object. The radar sensor 310 transmits the reflected signal 308 to the spectrum analyzer 316 through the signal path that is formed from the antenna 313 to the spectrum analyzer 316.

A frequency mixer 314 demodulates a linear signal prior to the frequency modulation, for example, the original chirp signal 301, from the received reflected signal 308. An amplifier 315 amplifies an amplitude of the demodulated linear signal.

The spectrum analyzer 316 may analyze the radiated chirp signal 301 and the received reflected signal 308. For example, the spectrum analyzer 316 compares the radiated chirp signal 301 and the received reflected signal 308. The spectrum analyzer 316 detects a frequency difference between the radiated chirp signal 301 and the received reflected signal 308. Referring to a graph 309 illustrated in FIG. 3, the frequency difference between the radiated chirp signal 301 and the received reflected signal 308 is constant during an interval in which an amplitude of the radiated chirp signal 301 increases linearly along a time axis, and is proportional to a range between the radar sensor 310 and the object. Thus, the range between the radar sensor 310 and the object may be derived from the frequency difference between the radiated chirp signal 301 and the received reflected signal 308. The spectrum analyzer 316 may transmit, to a processor of a radar data processing device, information obtained by the analyzing. The information to be transmitted to the processor may be generated from a radar signal, and is referred to herein as raw radar data.

For example, the spectrum analyzer 316 may calculate the range between the radar sensor 310 and the object as represented by Equation 1 below.

$$R = \frac{cTf_b}{2B} \qquad \text{Equation 1}$$

In Equation 1, R is the range between the radar sensor 310 and the object, and c is a velocity of light. T is a time length in an ascending interval of the radiated chirp signal 301. $f_b$ is a frequency difference between the radiated chirp signal 301 and the reflected signal 308 at a point in time in the ascending interval, and is also referred to as a beat frequency. B is a modulation bandwidth. The beat frequency $f_b$ may be derived as represented by Equation 2 below.

$$f_b = \frac{t_d B}{T} \qquad \text{Equation 2}$$

In Equation 2, $f_b$ is the beat frequency. $t_d$ is a time difference, for example, a delay time, between a point in time at which the chirp signal 301 is radiated and a point in time at which the reflected signal 308 is received.

A range to be calculated from radar data is represented by Equation 1 above, and range or distance resolving power to be calculated from radar data obtained by the radar sensor 310 may be represented by Equation 3 below.

$$d_{res} = \frac{c}{2B} \quad \text{Equation 3}$$

In Equation 3, $d_{res}$ is a range or distance resolving power, and c is a velocity of light. B is an allowable bandwidth for the radar sensor 310. The allowable bandwidth B may be a bandwidth that is stipulated in relevant rules or regulations in each country. For example, European Telecommunications Standards Institute (ETSI) and Federal Communications Commission (FCC) allow a 77 gigahertz (GHz) band for an automotive radar. A value of $d_{res}$ may decrease as a bandwidth increases as represented by Equation 3 above. Accordingly, the distance resolving power may be improved. However, an available bandwidth is restricted by relevant rules or regulations, and thus each radar sensor may have limited resolving power that is restricted in terms of calculating a range or distance from the sensor to an object.

A relative velocity may be a Doppler velocity which is a radial velocity from a target point towards the radar sensor 310. Doppler velocity resolving power to be calculated from radar data obtained by the radar sensor 310 may be represented by Equation 4 below.

$$v_{res} = \frac{\lambda}{2T_f} \quad \text{Equation 4}$$

In Equation 4, $v_{res}$ is Doppler velocity resolving power, and λ is a wavelength of a band used by the radar sensor 310. $T_1$ is a time length of a radar signal corresponding to single scanning, as a frame time given for a series of chirp signals. When a period of each chirp is T and n chirp signals are transmitted and received during the single scanning, the frame time $T_1$ may be nT. As represented by Equation 4, when the frame time $T_1$ increases, the Doppler velocity resolving power $v_{res}$ may decrease and be thereby improved. However, when the period given for each chirp signal increases, a measurable maximum velocity may decrease, and thus an allowable time for the single scanning in real-time operations may be exceeded. That is, by increasing the number of chirp signals to be used for the single scanning, a trade-off issue may occur, and thus an amount of data to be transmitted and an operation time may increase. Thus, each radar sensor may have limited resolving power in terms of calculating a Doppler velocity.

Figure 4:
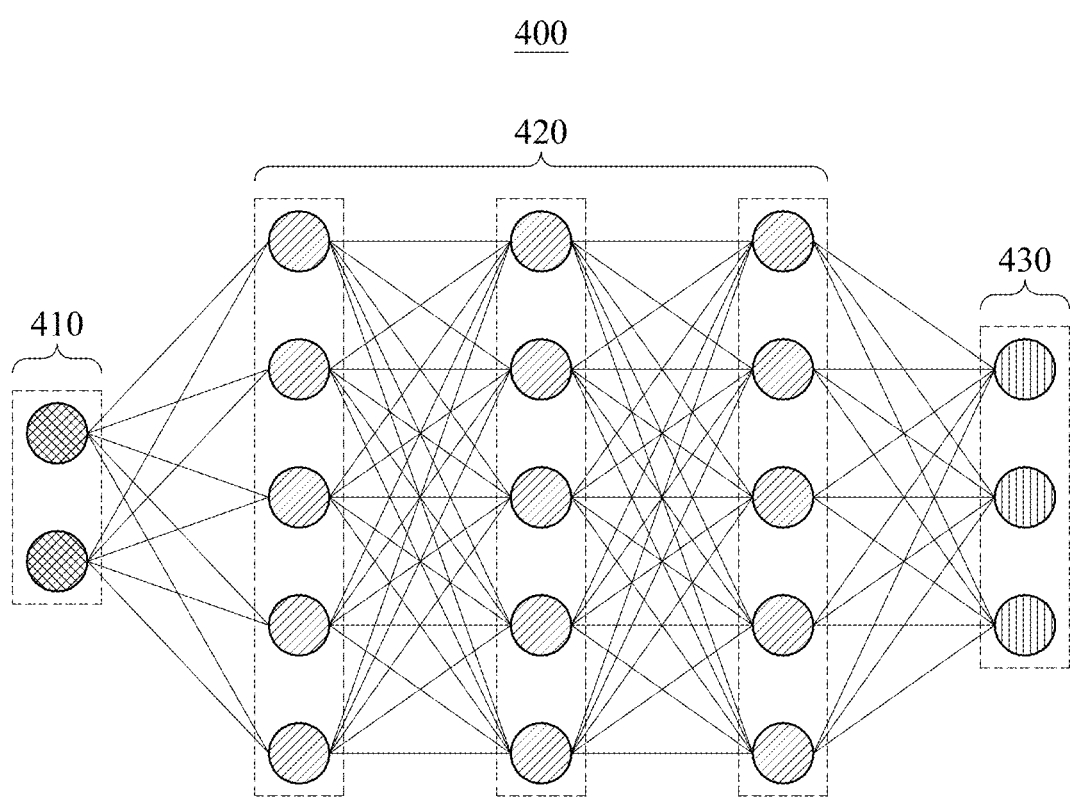
FIG. 4 illustrates an example of a resolution increase model, according to an embodiment.

FIG. 4 illustrates an example of a resolution increase model, according to an embodiment.

In an example, a resolution increase model may be designed to increase a resolution of radar data, for example, a radar scan image, and be of an architecture for machine learning and include a neural network 400. The resolution increase model may be designed to output data having a second resolution from input data having a first resolution. The second resolution may be greater than the first resolution. Thus, the second resolution may also be referred to herein as a high resolution, and the first resolution may also be referred to herein as a low resolution. In addition, the input data of the first resolution may indicate low-resolution input data, and the output data of the second resolution may indicate high-resolution output data.

The neural network 400 may be a deep neural network (DNN), as a non-limiting example. In such an example, the DNN may be one or more of a fully connected network, a deep convolutional network (DCN), and/or a recurrent neural network (RNN), or may include different or overlapping neural network portions respectively with such full, convolutional, or recurrent connections. The neural network 400 may increase a resolution of an image by mapping input data and output data that are in a nonlinear relationship based on deep learning. The deep learning is one of machine learning methods that processes an image from a bigdata set. The deep learning may be implemented by mapping of the input data and the output data through supervised or unsupervised learning or training, such that when trained the resultant machine learning model, engine, or example neural network may intuitively map further input data to output data with a desired accuracy or reliability.

Referring to FIG. 4, the example neural network 400 includes an input layer 410, hidden layers 420, and an output layer 430. Each of the input layer 410, the hidden layers 420, and the output layer 430 may respectively include a plurality of artificial nodes.

Although the hidden layers 420 are illustrated in FIG. 4 as including three layers for convenience of description, the hidden layers 420 may include various numbers of layers. In addition, although the neural network 400 is illustrated in FIG. 4 as including a separate input layer, for example, the input layer 410, to receive input data, the input data may be input directly to the hidden layers 420. Artificial nodes of each of the layers of the neural network 400, excluding the output layer 430, may be connected to artificial nodes of a subsequent layer through links to transmit an output signal. The number of the links may correspond to the number of the artificial nodes included in the subsequent layer. The links may be referred to as connections or connection weights.

An output of an activation function associated with weighted inputs of artificial nodes included in a previous layer may be input to each of artificial nodes included in the hidden layers 420. Here, a weighted input is a product of a multiplication between an input of the artificial nodes included in the previous layer and a weight. The weight may also be referred to as a parameter of the neural network 400, and connection weights of a layer or between layers, or of portions or of the whole, of the neural network 400 may be referred to as parameters of the neural network 400, as non-limiting examples. The activation function may be any one of, for example, a sigmoid, a hyperbolic tangent (tan h), and a rectified linear unit (ReLU), as non-limiting examples, and such an activation function may be used to form or impart a nonlinearity of or to the neural network 400. Weighted inputs of artificial nodes included in a previous layer, for example, a final hidden layer, may be output to, or input by, each of the artificial nodes included in the output layer 430. Here, a process in which weighted data is input from a layer to a layer subsequent to the layer may be referred to as propagation. The neural network 400 may include a convolutional layer configured for convolution filtering. For example, a device, for example, a radar data processing device, may propagate information from a previous layer to a convolutional layer, and may perform convolution filtering on the propagated information, and then propagate a result of the convolution filtering to a subsequent layer.

Although the neural network 400 is described above as an example of the resolution increase model, the resolution increase model is not limited to the neural network 400.

Figure 5:
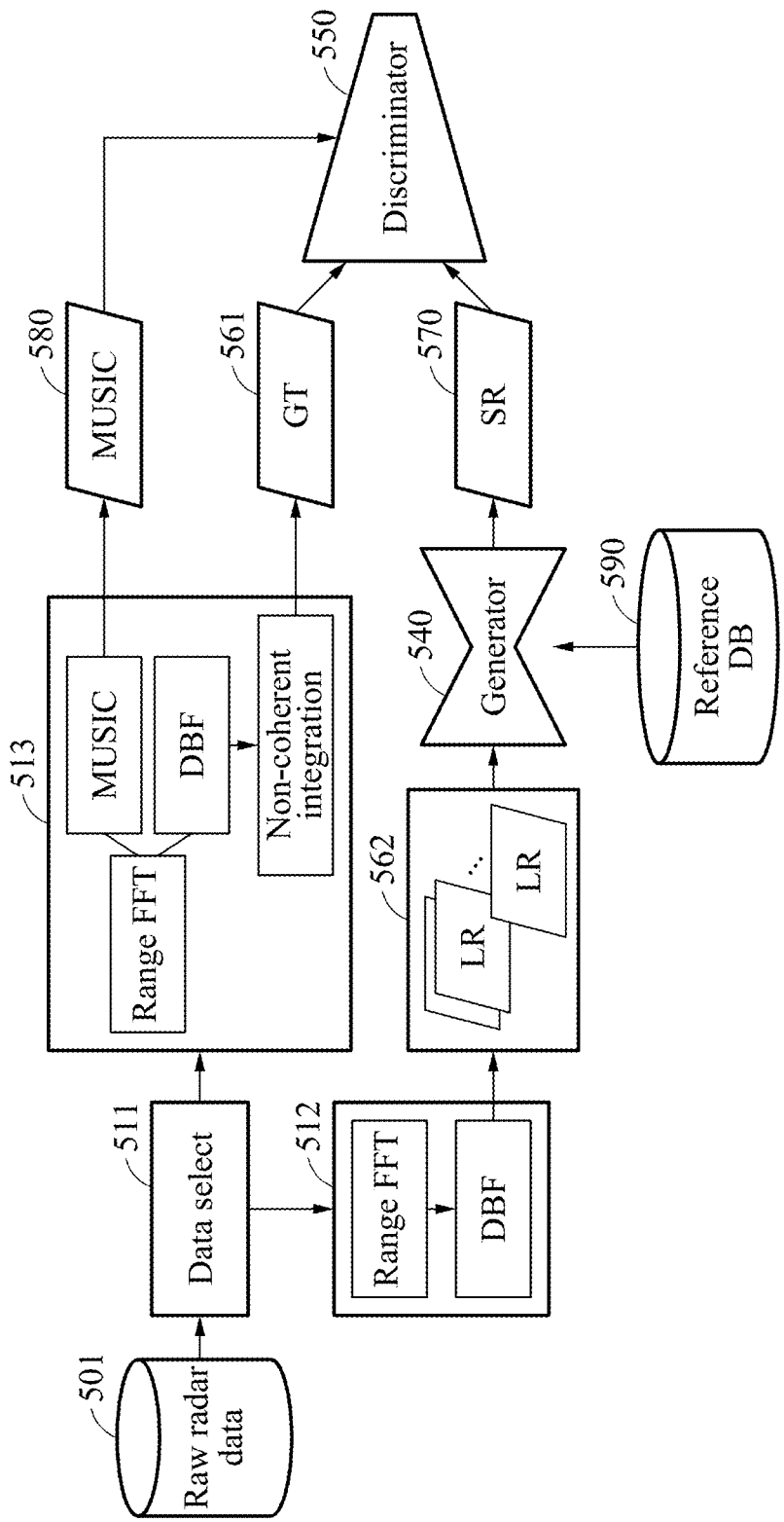
FIGS. 5 and 6 illustrate examples of a resolution increase model of a generative adversarial network (GAN) architecture, according to embodiments.
Figure 6:
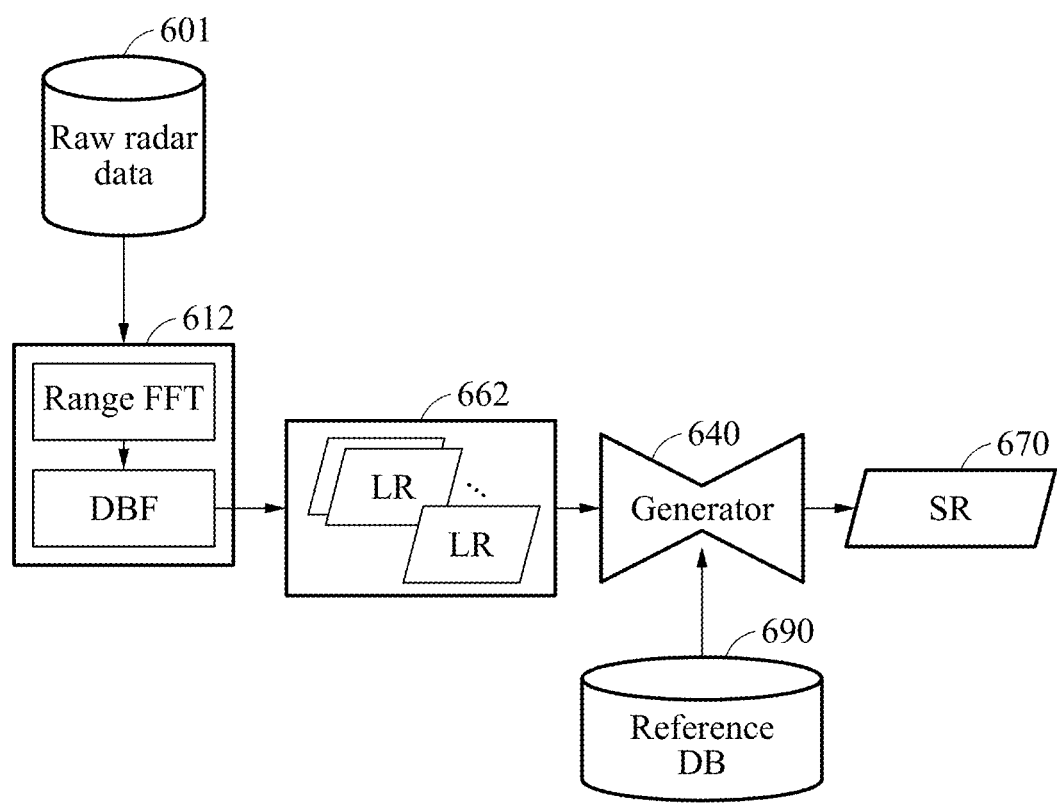

FIGS. 5 and 6 illustrate examples of a resolution increase model of a generative adversarial network (GAN) architecture, according to an embodiment.

A GAN may output a realistic image as a result due to its structural characteristic and an adversarial loss. However, a resolution increase model of such a GAN architecture may select one from manifolds that may be output and generate an output that may fool a discriminator. Thus, the resolution increase model of such a GAN architecture may only generate a plausible high-resolution output. In an example, the resolution increase model may be of such a GAN architecture, and may include a generator model and a discriminator model. The generator model may generate candidates, while the discriminator model may evaluate or distinguish the candidates produced by the generator model. FIG. 5 illustrates an example of a training process for the resolution increase model of the GAN architecture, and FIG. 6 illustrates an example of outputting high-resolution data using the resolution increase model after the training process is completed.

Referring to FIG. 5, in operation 511, a training device selects data from original raw radar data 501. For example, the training device may select, from the raw radar data 501, high-resolution data and low-resolution data with respect to a dimension, for example, an angular dimension, that is to be used for each iteration. For example, the training device may generate the low-resolution data by extracting data from the raw radar data 501, and generate the high-resolution data by extracting more data from the raw radar data 501. The raw radar data 501 may be data collected through a radar sensor with higher performance than that of a radar sensor that is actually mounted in a radar data processing device.

The training device performs high-resolution preprocessing operation 513 on the selected high-resolution data. The high-resolution preprocessing operation 513 on a range-angle map may include a range fast Fourier transform (FFT), a multiple signal classification (MUSIC), DBF, and a noncoherent integration, as non-limiting examples. The high-resolution preprocessing operation 513 on a range-velocity map may include a range FFT, a velocity FFT, and a noncoherent integration, as non-limiting examples. Similarly, the high-resolution preprocessing operation 513 on a velocity-angle map may include a velocity FFT, MUSIC, DBF, and a noncoherent integration, as non-limiting examples. The high-resolution preprocessing operation 513 may be performed to increase a resolution for one dimension among a range, an angle, and a velocity, or two or more dimensions among a range, an angle, and a velocity. In addition, the training device performs a low-resolution preprocessing operation 512 on the selected low-resolution data. The low-resolution preprocessing operation 512 may include a range FFT and DBF, as non-limiting examples.

As a result of the high-resolution preprocessing operation 513, the training device generates ground truth (GT) data as a high-resolution training GT 561. As a result of the low-resolution preprocessing operation 512, the training device generates a low-resolution training input 562. In addition, the training device generates a MUSIC result 580 as an additional input. However, the additional input is not limited to the MUSIC result 580, and may be results of other radar DoA estimation methods. The high-resolution training GT 561 and the low-resolution training input 562 may be radar scan images of a range-angle map format.

In an example, the training device trains a generator model 540 and a discriminator model 550 based on a temporary high-resolution, or super resolution (SR), output 570, the high-resolution training GT 561, and a result that is output by the discriminator model 550 from DoA information estimated based on a subspace type-based estimation method. For example, the subspace type-based estimation method may be a MUSIC algorithm, and the DoA information may be a MUSIC result value. The generator model 540 and the discriminator model 550 may be embodied as described above with reference to FIG. 4, but not limited to these examples.

For example, the training device generates the temporary high-resolution output 570 from the low-resolution (LR) training input 562 and reference DB 590, using the generator model 540. For example, the training device generates the temporary high-resolution output 570 by inputting the low-resolution training input 562 and the reference DB 590 to an input layer and/or intermediate layer of the generator model 540 and sequentially propagating the inputs to layers including nodes included in the generator model 540. Such a data propagating process in the generator model 540 may be performed similarly to what has been described above with reference to FIG. 4. The training device inputs, to the discriminator model 550, the temporary high-resolution output 570 output by the generator model 540, the high-resolution training GT 561, and the DoA information estimated based on the subspace type-based estimation method.

The training device outputs authenticity-determining information based on the temporary high-resolution output 570, the high-resolution training GT 561, and the DoA information estimated based on the subspace type-based estimation method, using the discriminator model 550. The authenticity-determining information may be information indicating whether the temporary high-resolution output 570 output by the generator model 540 is real or fake, compared to the high-resolution training GT 561 which is a reference GT. The training device calculates an adversarial loss based on the authenticity-determining information and trains the generator model 540 and the discriminator model 550 based on the calculated adversarial loss. The training device may individually train one of the generator model 540 and the discriminator model 550, or may train the generator and discriminator models 540 and 550 simultaneously or sequentially.

When the training is completed, the training device removes the discriminator model 550 from the resolution increase model.

The MUSIC result 580, which is an additional input used in the training process, may indicate positions of dominant signals. Thus, when the generator model 540 generates the temporary high-resolution output 570 irrespective of the positions of the dominant signals, the discriminator model 550 may readily determine such an output to be fake. Thus, to fool the discriminator model 550, the trained generator model 540 may generate output data representing DoA information that is accurately predicted as in MUSIC and ample information that may be represented by DBF of greater antenna data.

Referring to FIG. 6, a discriminator model may be removed from a resolution increase model after training is completed in a GAN architecture.

As shown in FIG. 6, a radar data processing device generates raw radar data 601 by a radar sensor based on transmission and reception of a radar signal. The radar data processing device performs a preprocessing operation 612 on the generated raw radar data 601. The preprocessing operation 612 may include a range FFT and DBF, but is not limited thereto. The radar data processing device generates input radar data 662 as a result of the preprocessing operation 612. For example, the input radar data 662 may be a radar scan image of a range-angle map format. As illustrated in FIG. 6, the radar data processing device generates high-resolution output radar data 670 from reference data of a reference DB 690 along with the input radar data 662 generated by preprocessing the raw radar data 601, using the resolution increase model including a trained generator model 640. The generated high-resolution output radar data 670 may have a higher resolution than the input radar data 660. The reference data may be data having a higher resolution than that of the input radar data 660, but is not limited thereto. The resolution of the reference data may be the same as that of output radar data, but is not limited thereto. Thus, the resolution of the reference data may be higher or lower than that of the output radar data.

Figure 7:
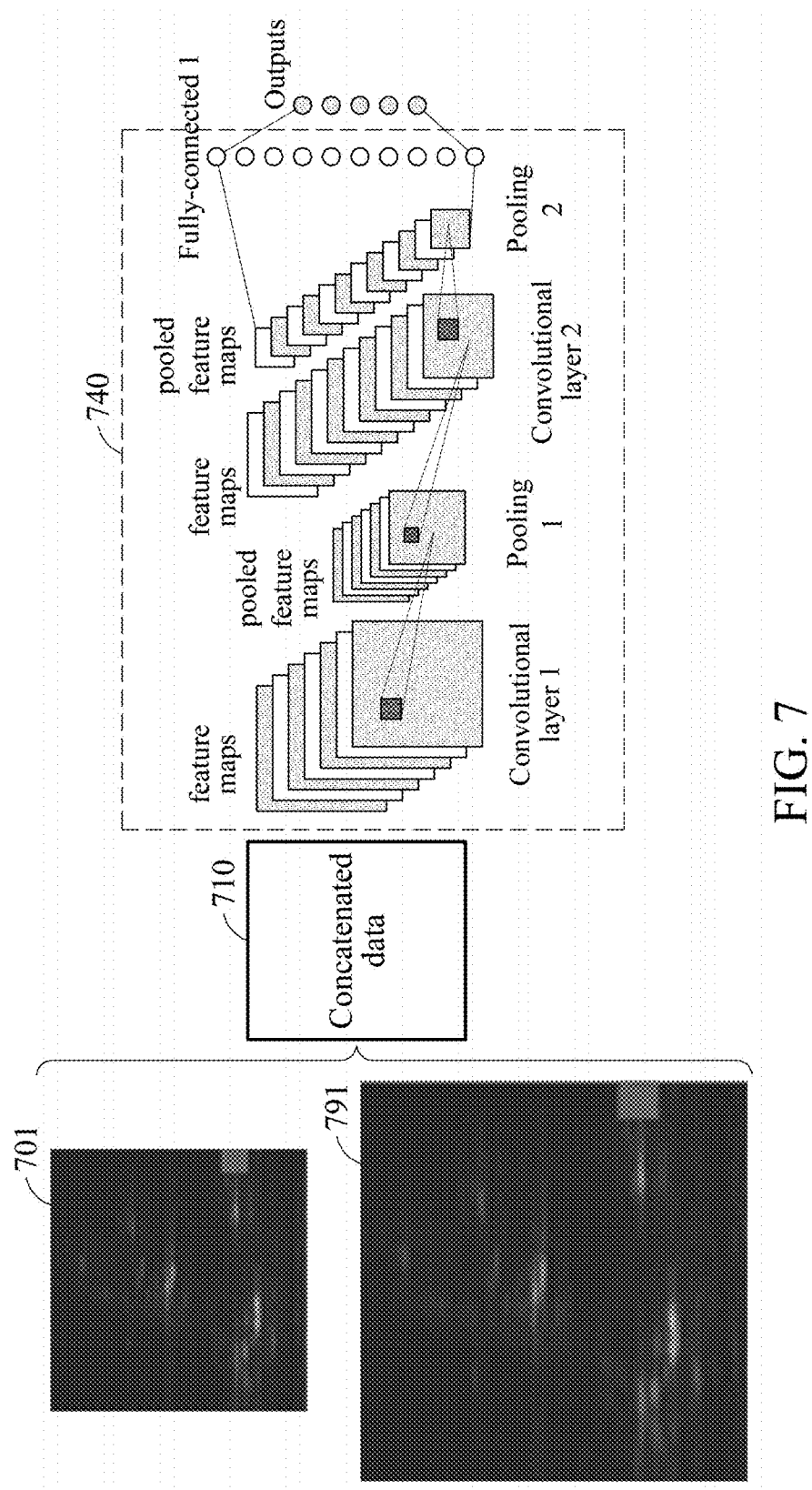
FIGS. 7 and 8 illustrate examples of applying reference data to a resolution increase model by a radar data processing device, according to embodiments.
Figure 8:
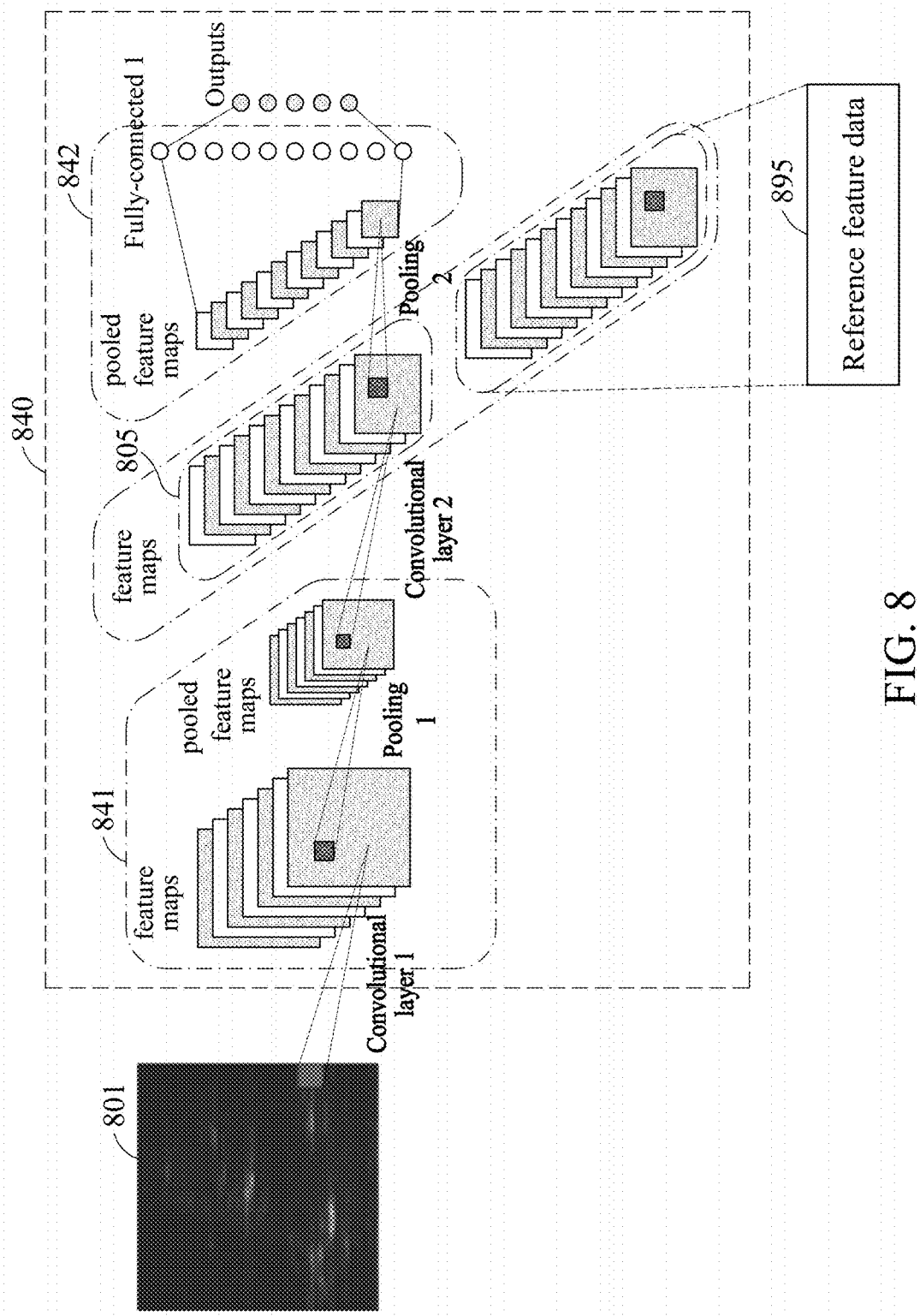

FIGS. 7 and 8 illustrate examples of applying reference data to a resolution increase model by a radar data processing device, according to embodiments.

FIGS. 7 and 8 illustrate examples of how a radar data processing device generates an input radar image from input radar data. However, the disclosure is not limited to the illustrated examples, and the radar data processing device may provide a resolution increase model with the input radar data itself or another format of data obtained by converting the input radar data. In the example of FIG. 7, an input radar image and a reference radar image may be range-angle maps, and may indicate a probability of an object being present at a range and an angle.

In the example of FIG. 7, the radar data processing device generates input data 710 by concatenating a reference radar image 791 as reference data to an input radar image 701. The reference radar image 791 may have a resolution higher than that of the input radar image 701, but is not limited to having a resolution higher than that of the input radar image 701. In addition, although the input data 710 is described herein as being data obtained by simply concatenating the input radar image 701 and the reference radar image 791, the disclosure is not limited to such an example. For example, the input data 710 may be single data of a matrix format or a vector format, as non-limiting examples, that is generated through other merging operations.

The radar data processing device generates an output radar image as output radar data from the input data 710, using a resolution increase model 740. Although the resolution increase model 740 is illustrated in FIG. 7 as including one or more convolutional layers, for example, convolutional layer 1 and convolutional layer 2, and one or more pooling layers, for example, pooling 1 and pooling 2, the disclosure is not limited to the illustrated example.

In the example of FIG. 8, the radar data processing device uses reference feature data 895 as reference data. For example, the reference feature data 895 may be feature data extracted from a reference radar image using a feature extraction model. The feature extraction model may be a model, for example, a neural network, that is configured to extract a feature of data, for example, an image. In the example, the radar data processing device extracts input feature data 805 from input radar data 801 using a layer 841 which is a portion of a resolution increase model 840. Although the layer 841 is illustrated in FIG. 8 as including at least one convolutional layer, for example, convolutional layer 1, and at least one pooling layer, for example, pooling 1, the disclosure is not limited to the illustrated example.

The radar data processing device generates output radar data from the input feature data 805 and the reference feature data 895 using a layer 842 which is another portion of the resolution increase model 840. For example, the radar data processing device may concatenate, to the input feature data 805, the reference feature data 895 that is stored before the input radar data 801 is obtained. The radar data processing device may generate the output radar data from data obtained by concatenating the reference feature data 895 and the input feature data 805, using the layer 842 of the resolution increase model 840. Although the layer 842 is illustrated in FIG. 8 as including at least one pooling layer, for example, pooling 2, the disclosure is not limited to the illustrated example. In addition, the reference feature data 895 and the input feature data 805 may be the same in a level of abstraction, but is not limited thereto. For example, the number of convolutional layers applied to a reference scan image to extract the reference feature data 895 may be identical to or different from the number of convolutional layers applied to an input radar scan image to extract the input feature data 805.

Thus, the radar data processing device may maintain feature data that may represent high-level details or texture, instead of maintaining an original reference radar scan image as a reference DB. The feature data may be abstracted data of data, for example, an image, and be of a feature vector format, for example. A size of a memory of the reference DB including the feature data may be reduced. The reference feature data 895 may be stored in the reference DB before the input radar data 801 is obtained.

Figure 9:
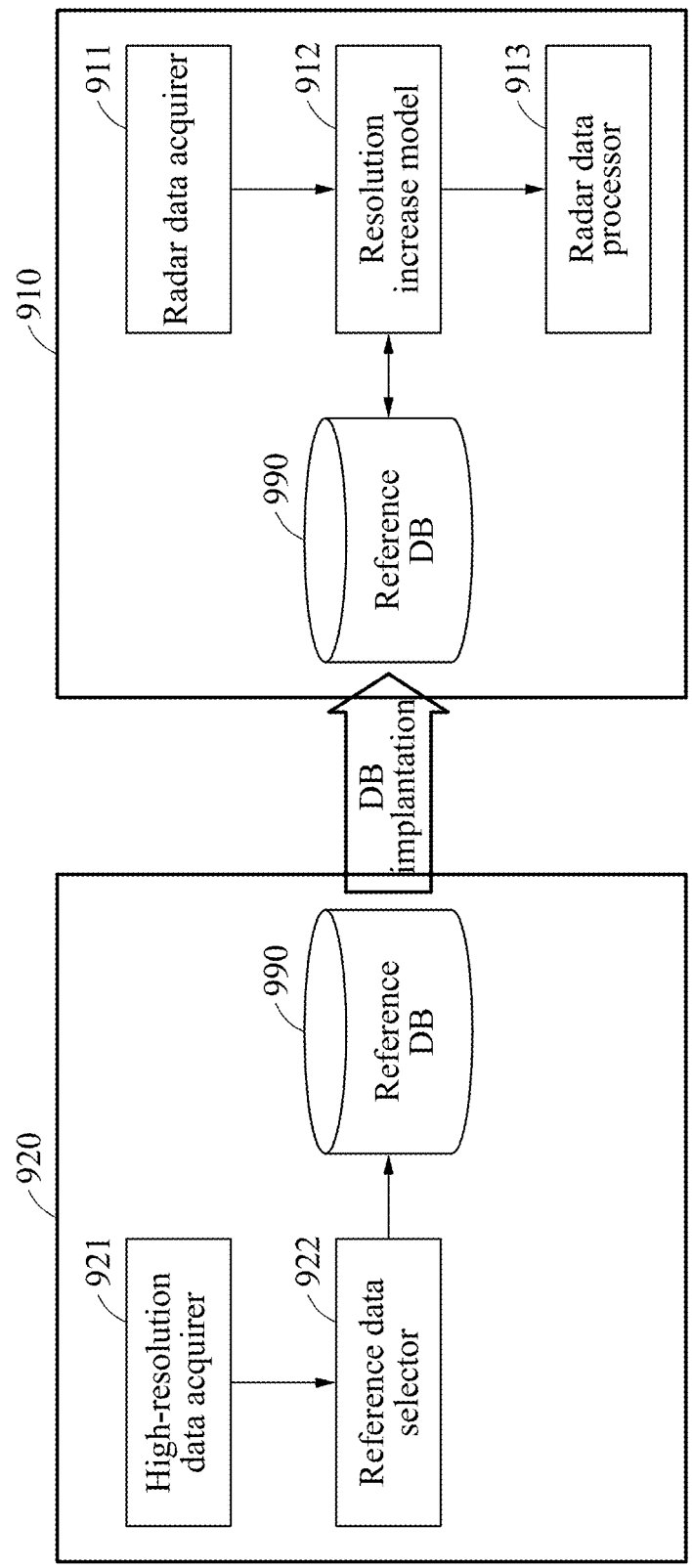
FIG. 9 illustrates an example of collecting reference data using a high-performance radar sensor, according to an embodiment.

FIG. 9 illustrates an example of collecting reference data using a high-performance radar sensor, according to an embodiment.

In an example, reference data may be radar data that is obtained by another radar sensor having a resolution higher than that of a radar sensor before input radar data is obtained.

Referring to FIG. 9, a reference data collecting device 920 includes, for example, a high-resolution data acquirer 921 and a reference data selector 922. The high-resolution data acquirer 921 may include a high-performance radar sensor that may generate high-resolution radar data. The high-performance radar sensor may be high-end hardware. The reference data selector 922 may generate a reference DB 990 by processing and selecting the high-resolution radar data collected through the high-resolution data acquirer 921. For example, the reference data selector 922 may classify the high-resolution radar data based on a surrounding environment and store the classified radar data as reference data. For another example, the reference data selector 922 may classify the high-resolution radar data based on a moving direction of a radar sensor.

A radar data processing device 910 includes, for example, a radar data acquirer 911, a resolution increase model 912, and a radar data processor 913. The resolution increase model 912 and the radar data processor 913 are similar to the resolution increase models and the radar data processors described above, and thus a more detailed and repeated description of the resolution increase model 912 and the radar data processor 913 will be omitted here for brevity. The radar data acquirer 911 may include a radar sensor having performance lower than that of the high-resolution data acquirer 921. The reference DB 990 generated by the reference data collecting device 920 may be implanted in a memory of the radar data processing device 910. Thus, the radar data processing device 910 may include the reference DB 990 associated with high-resolution radar data, in addition to a relatively low-priced radar sensor. The radar data processing device 910 may generate high-resolution output radar data from the high-resolution reference DB 990 in addition to low-resolution radar data obtained through the radar data acquirer 911, using the resolution increase model 912. The radar data processing device 910 may restore a high-frequency component from low-resolution input radar data based on a high-frequency component of reference data. The reference data may be radar data obtained by another radar sensor having a field of view (FOV) overlapping at least a portion of a FOV of a radar sensor. For example, a FOV of the high-resolution data acquirer 921 and a FOV of the radar data acquirer 911 may be the same, but are not limited thereto.

In an example, the radar data processing device 910 may identify a surrounding environment around the radar data processing device 910. The surrounding environment used herein may refer to information associated with an environment around the radar data processing device 910. For example, when the radar data processing device 910 is embodied by a mobile application or a vehicle, the surrounding environment may be, for example, movement environment information. For example, when the radar data processing device 910 is provided in a vehicle, the radar data processing device 910 may identify a travel environment in which the vehicle travels as the movement environment information. The radar data processing device 910 may identify an expressway traveling state, a city road traveling state, an elevated road traveling state, and a tunnel traveling state, for example. The radar data processing device 910 may identify the movement environment information using the radar data. However, the disclosure is not limited to foregoing examples. For example, the radar data processing device 910 may identify the travel environment of the vehicle based on localization information (e.g., global positioning system (GPS) information and acceleration information) and geographical map data.

As described above, the reference data selector 922 may generate the reference DB 990 by classifying reference data for each set of the movement environment information. The radar data processing device 910 may search the reference DB 990 for reference data corresponding to the identified surrounding environment. The radar data processing device 910 may obtain the reference data corresponding to the identified surrounding environment from the reference DB 990. For example, when the vehicle is identified as currently traveling on an expressway, the radar data processing device 910 may load reference data selected as the expressway traveling state, and provide the loaded reference data to the resolution increase model 912 along with input radar data.

Figure 10:
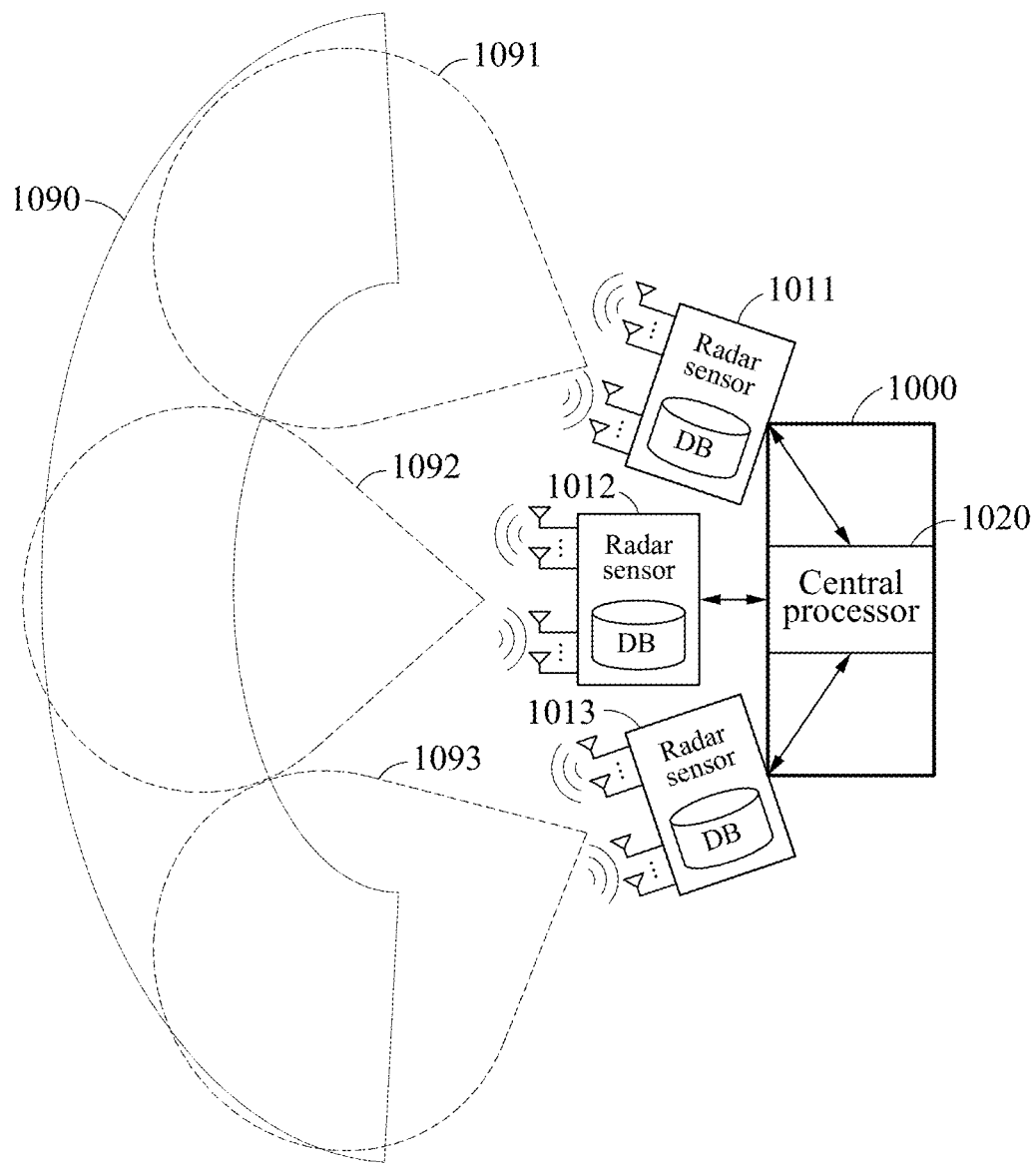
FIG. 10 illustrates an example of collecting reference data using a plurality of radar sensors, according to an embodiment.

FIG. 10 illustrates an example of collecting reference data using a plurality of radar sensors, according to an embodiment.

Referring to FIG. 10, a plurality of radar sensors, for example, a first radar sensor 1011, a second radar sensor 1012, and a third radar sensor 1013, is installed in various portions of a vehicle. A radar data processing device 1000 may calculate, as follows, a range to a target point with respect to all directions of the vehicle, a direction (e.g., steering angle), and a relative velocity, based on information sensed by the first, second, and third radar sensors 1011, 1012, and 1013. The radar data processing device 1000 may be disposed in the vehicle, for example. The vehicle may provide various functions conducive to traveling of the vehicle, for example, ACC, BSD, and lane change assistance (LCA), using information obtained based on the information collected by the first, second, and third radar sensors 1011, 1012, and 1013.

Figure 11:
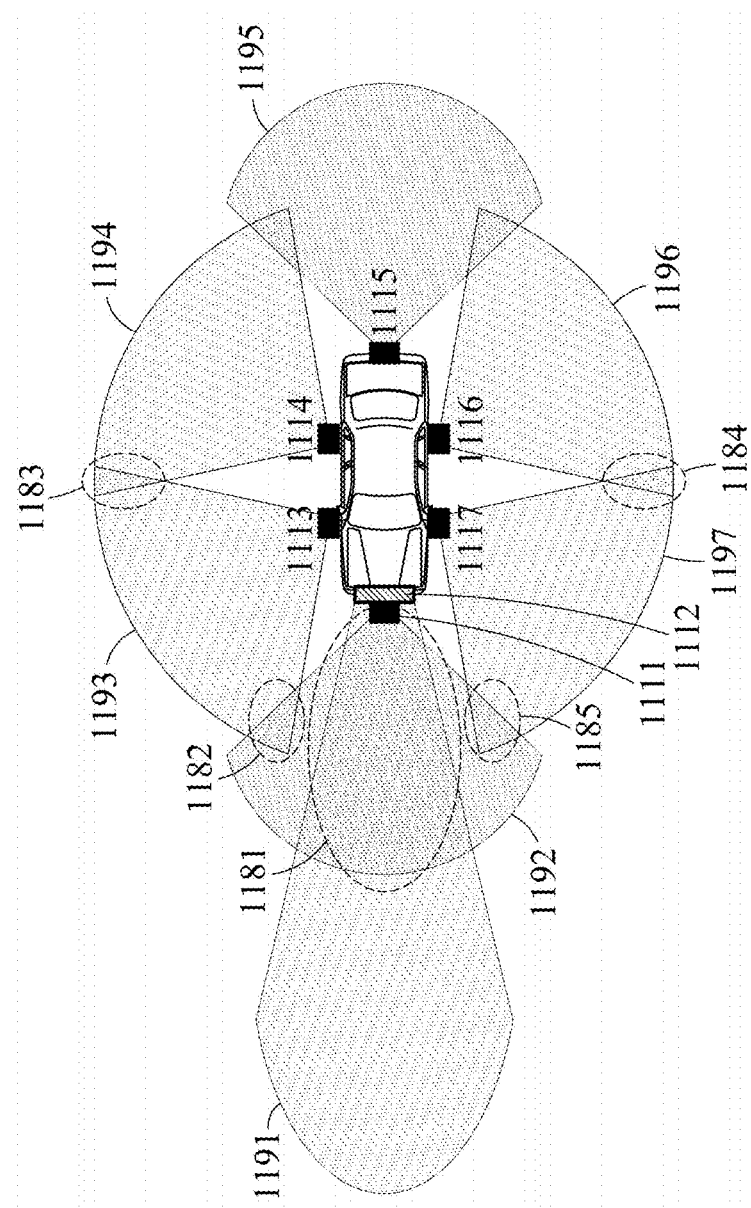
FIG. 11 illustrates an example of reference data of some radar sensors, among a plurality of radar sensors, that share a field of view (FOV), according to an embodiment.

As illustrated in FIG. 11, the first, second, and third radar sensors 1011, 1012, and 1013 disposed in the same moving object may sense a same or similar contextual scene. For example, even though respective FOVs of the first, second, and third radar sensors 1011, 1012, and 1013 do not overlap, each of the first, second, and third radar sensors 1011, 1012, and 1013 may sense a portion of a continuous outside scene 1090. For example, the first radar sensor 1011 may sense the outside scene 1090 in a first FOV range 1091, the second radar sensor 1012 may sense the outside scene 1090 in a second FOV range 1092, and the third radar sensor 1013 may sense the outside scene 1090 in a third FOV range 1093. In this example, even though the first FOV range 1091, the second FOV range 1092, and the third FOV range 1093 do not overlap one another, the first, second, and third radar sensors 1011, 1012, and 1013 may depend on a movement of the moving object. That is, radar data that is sensed by the first, second, and third radar sensors 1011, 1012, and 1013 disposed in the moving object, for example, a mobile terminal or a vehicle, may be dependent on a context of scenes. As described above, it is possible to use radar data obtained by other radar sensors having nonoverlapping FOVs to increase a resolution of radar data of a radar sensor used.

For example, one of the first, second, and third radar sensors 1011, 1012, and 1013 may obtain input radar data, and another one of the first, second, and third radar sensors 1011, 1012, and 1013 may obtain additional radar data. The radar data processing device 1000 may generate reference data from the additional radar data. The one of the of the first, second, and third radar sensors 1011, 1012, and 1013 and the other one of the first, second, and third radar sensors 1011, 1012, and 1013 may be provided in the same moving object.

For example, each of the first, second, and third radar sensors 1011, 1012, and 1013 may include a processor and a reference DB, and the first, second, and third radar sensors 1011, 1012, and 1013 may exchange data with one another. One of the first, second, and third radar sensors 1011, 1012, and 1013 may transfer, to another one of the first, second, and third radar sensors 1011, 1012, and 1013, a result obtained by preprocessing radar data and/or radar feature data extracted from the radar data. When generating the radar data, the first, second, or third radar sensor 1011, 1012, or 1013 may immediately exchange data without a delay. However, the disclosure is not limited to the foregoing examples, and the first, second, and third radar sensors 1011, 1012, and 1013 may exchange data with time intervals.

In addition, the radar data processing device 1000 may process the radar data collected by each of the radar sensors first, second, and third 1011, 1012, and 1013 through a central processor 1020. For example, the radar data processing device 1000 may be embodied in a platform using various types of sensors, for example, a self-driving vehicle. In this example, the central processor 1020 may collate data from the first, second, and third radar sensors 1011, 1012, and 1013, and control the vehicle based on a result of the collating. The central processor 1020 may generate high-resolution output radar data with respect to a FOV of each radar sensor from the radar data collected by each of the first, second, and third radar sensors 1011, 1012, and 1013, and from the reference data, using a resolution increase model. Since the radar data of each of the first, second, and third radar sensors 1011, 1012, and 1013 is processed by the central processor 1020, an overhead in data transmission may be reduced and accuracy may be improved. Here, a radar sensor may extract radar feature data from radar data and transfer the extracted radar feature data to the central processor 1020, and thus contribute to improving a data transmission speed.

The radar data processing device 1000 may generate more realistic high-resolution output radar data, using a reference DB corresponding to an individual radar sensor and using reference data obtained by another radar sensor.

The example of FIG. 10 illustrates that an individual radar sensor at a sensor level includes a reference DB, a radar sensor operates to increase a resolution, and thus high-resolution radar data is output. Hereinafter, examples of using, as reference data, radar data obtained by another radar sensor having similar performance will be described in detail. For example, an example of data exchange among radar sensors for different uses will be described with reference to FIG. 11. An example of data exchange among radar sensors that sense a same scene or object in neighboring time frames will be described with reference to FIG. 12. In addition, an example of retrieving reference data from an external server will be described with reference to FIG. 13.

FIG. 11 illustrates an example of reference data of some radar sensors, among a plurality of radar sensors, that share a FOV, according to an embodiment.

In an example, another radar data including contents similar to those of radar data may be used as reference data to increase a resolution of the radar data.

Referring to FIG. 11, a radar data processing device may be provided in a vehicle, and include a plurality of radar sensors. The radar sensors may be arranged to cover a wide sensing area, for example, all directions of 360 degrees)(°. In the example of FIG. 11, a first radar sensor 1111 and a second radar sensor 1112 may cover front sensing areas 1191 and 1192, respectively. A third radar sensor 1113, a fourth radar sensor 1114, a sixth radar sensor 1116, and a seventh radar sensor 1117 may cover side sensing areas 1193, 1194, 1196, and 1197, respectively. A fifth radar sensor 1115 may cover a rear sensing area 1195.

The first through seventh radar sensors 1111 through 1117 may have various FOVs and sensing distances. A specification of a radar sensor may be determined based on a position at which the radar sensor is disposed in a moving object, for example, a vehicle. For example, the first radar sensor 1111, which is mounted on a front side of the moving object, may be a long-range radar (LRR) sensor having a narrow FOV, a low range (distance) resolution (e.g., a great range resolving power unit), and a low angle resolution (e.g., a great angular resolving power unit). However, the first radar sensor 1111 may have a long detection range (distance) and a high maximum detectable velocity. For example, a maximum detectable velocity of another type of radar sensor is from −100 kilometers per hour (km/h) to 100 km/h, whereas such an LRR type of radar sensor may have a maximum detectable velocity from −300 km/h to 200 km/h. Such an LRR type may be used for ACC. The third radar sensor 1113, the fourth radar sensor 1114, the sixth radar sensor 1116, and the seventh radar sensor 1117, which are mounted on sides of the moving object, may be mid-range radar (MRR) sensors having a medium resolution and FOV. The second radar sensor 1112 and the fifth radar sensor 1115, which are respectively mounted on a front side of the moving object and a rear side of the moving object, may be short range radar (SRR) sensors having a short detection range (distance), but having a wide FOV, a high range (distance) resolution, and a high angle resolution. The MRR and the SRR may be used for stop and go, ACC, LCA, and BSD for the vehicle, and may be used as a back-up radar.

In an example, the radar data processing device may exchange radar data obtained by the first through seventh radar sensors 1111 through 1117 of different specifications to exchange with radar data obtained by other radar sensors, or a central processor of the radar data processing device may collect a plurality of sets of radar data, thereby increasing a resolution of each radar data. Each of the first through seventh radar sensors 1111 through 1117, which are disposed to enable 360° omnidirectional sensing, as illustrated in FIG. 11, may share a partial sensing area and/or FOV with another radar sensor among the first through seventh radar sensors 1111 through 1117. In the example of FIG. 11, the first radar sensor 1111 and the second radar sensor 1112 may share a first overlapping sensing area 1181. The second radar sensor 1112 and the third radar sensor 1113 may share a second overlapping sensing area 1182. The third radar sensor 1113 and the fourth radar sensor 1114 may share a third overlapping sensing area 1183. Similarly, the sixth radar sensor 1116 and the seventh radar sensor 1117 may share a fourth sensing area 1185. The seventh radar sensor 1117 and the second radar sensor 1112 may share a fifth overlapping sensing area 1185.

For example, another radar sensor among the first through seventh radar sensors 1111 through 1117 of which at least a portion of a FOV overlaps at least a portion of a FOV of a radar sensor among the first through seventh radar sensors 1111 through 1117 of the radar senor processing device may obtain additional radar data. The radar data processing device may generate reference data from the additional radar data obtained by the other radar sensor among the first through seventh radar sensors 1111 through 1117 having the overlapping FOV. The additional radar data sensed by the other radar sensor among the first through seventh radar sensors 1111 through 1117 having the overlapping FOV may be associated with a same partial scene of a continuous scene, and thus may be of great value as the reference data to increase a resolution of radar data. The example of FIG. 10 illustrates that each radar sensor among the first through seventh radar sensors 1111 through 1117 includes a reference DB, but the disclosure is not limited to the illustrated example. For example, each radar sensor among the first through seventh radar sensors 1111 through 1117 may use, as reference data, radar data transferred from another radar sensor among the first through seventh radar sensors 1111 through 1117 without having a prestored reference DB. The reference data obtained by the other radar sensor among the first through seventh radar sensors 1111 through 1117 may be stored and/or transferred in a format of raw radar data, but is not limited thereto. For example, the reference data may be extracted in a form of high-level feature data from the raw radar data and may then be transferred.

Figure 12:
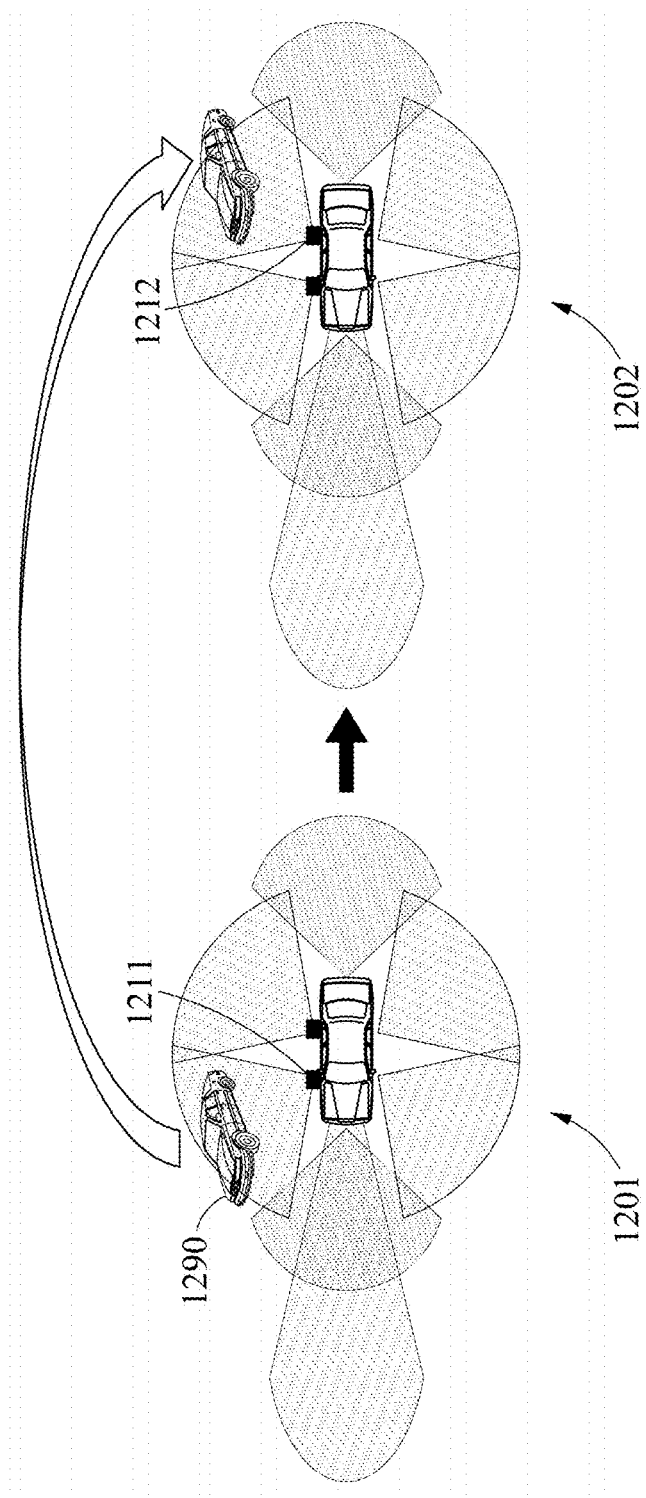
FIG. 12 illustrates an example of reference data of some radar sensors, among a plurality of radar sensors, that sense a same object, according to an embodiment.

FIG. 12 illustrates an example of reference data of some radar sensors, among a plurality of radar sensors, that sense a same object, according to an embodiment.

In an example, to increase a resolution of input radar data obtained by a radar sensor, a radar data processing device may generate reference data using, of previous radar data obtained by another radar sensor in a previous time frame, data that shares a FOV of the radar sensor and at least a portion of a scene in a current time frame. That is, the radar data processing device may determine the other radar sensor that senses the same partial scene in the previous time frame for each radar sensor in the current time frame, based on one of localization information of a moving object (e.g., vehicle), movement information, arrangement information of radar sensors, and information associated with a sensing area of the radar sensors, or a combination of two or more of localization information of a moving object (e.g., vehicle), movement information, arrangement information of radar sensors, and information associated with a sensing area of the radar sensors. The radar data processing device may use the radar data sensed by the other radar sensor in the previous time frame as reference data to increase a resolution of the input radar data obtained by the radar sensor in the current time frame.

In the example of FIG. 12, in a vehicle in which radar sensors are provided as illustrated, an area that is sensed by a radar sensor may be sensed by another radar sensor based on a movement of the vehicle while the vehicle is traveling and an elapsed time. For example, when the vehicle travels straight, a scene sensed by a first radar sensor 1211 at a first time point 1201 may be sensed by a second radar sensor 1212 at a second time point 1202 after the first time point 1201. In this example, radar data obtained by the first radar sensor 1211 at the first time point 1201 may be used as reference data to increase a resolution of input radar data obtained by the second radar sensor 1212 at the second time point 1202. A partial scene sensed by the first radar sensor 1211 may overlap a partial scene to be sensed by the second radar sensor 1212 as the vehicle travels after a certain amount of time, for example, a short time, elapses.

In addition, the radar data processing device may generate reference data using, of previous radar data obtained by another radar sensor in a previous time frame, data including an object detected through a radar sensor in a current time frame. In the example of FIG. 12, when a target 1290 is detected around a vehicle, the radar data processing device may determine another radar sensor that senses the target 1290 in a previous time frame based on one of localization information of the vehicle, movement information of the vehicle, arrangement information of radar sensors, information associated with sensing areas of the radar sensors, and movement information of the target 1290, or a combination of two or more thereof. For example, when the vehicle travels straight, an object sensed by the first radar sensor 1211 at the first time point 1201 may be sensed by the second radar sensor 1212 at the second time point 1202 after the first time point 1201. The radar data processing device may use radar data obtained by another radar sensor in a previous time frame as reference data to increase a resolution of input radar data obtained by a radar sensor in a current time frame. Thus, the radar data processing device may use, as reference data, multi-view information sensed at different time points with respect to the same target 1290.

Although the example of FIG. 12 illustrates a case in which a vehicle travels straight, the disclosure is not limited to the illustrated example. For example, when the vehicle makes a right turn, a left turn, or a U-turn, radar sensors provided on a front side, sides, and a rear side of the vehicle may sense the same target 1290 and/or scene from different views at different time points.

Figure 13:
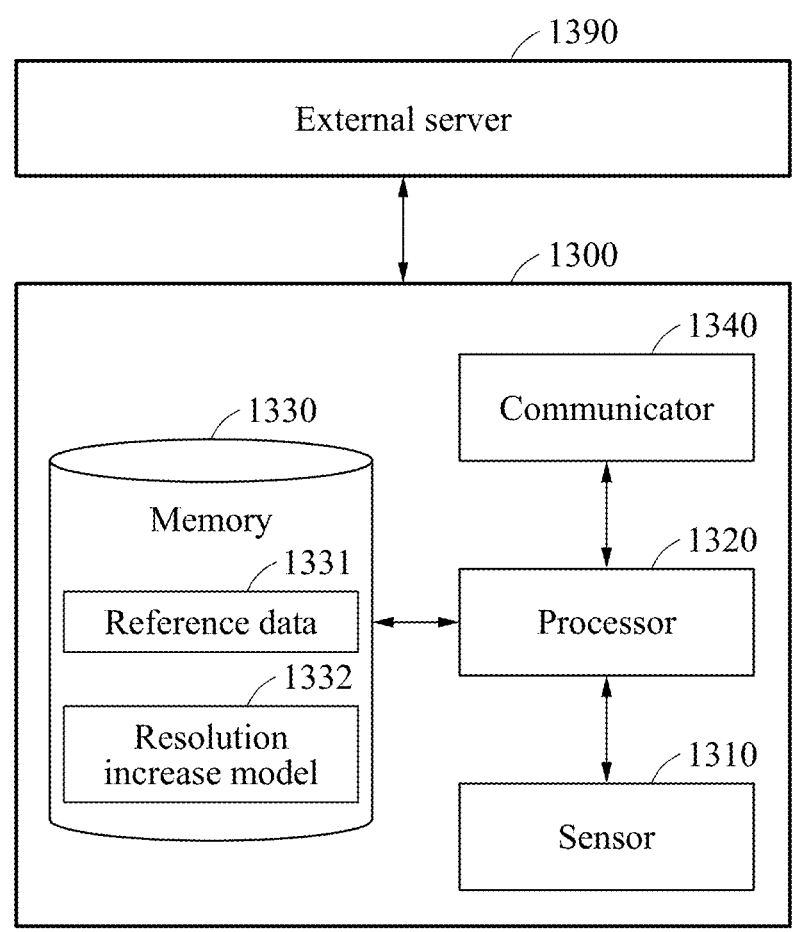
FIG. 13 illustrates an example of retrieving and receiving reference data from an external server by a radar data processing device, according to an embodiment.

FIG. 13 illustrates an example of retrieving and receiving reference data from an external server by a radar data processing device 1300, according to an embodiment.

Referring to FIG. 13, the radar data processing device 1300 receives reference data 1331 corresponding to a surrounding environment that is identified from an external DB of the radar data processing device 1300. For a more detailed example description of the surrounding environment, reference may be made to the relevant description provided above with reference to FIG. 9. The radar data processing apparatus 1300 may establish wired or wireless communication with an external server 1390 through a communicator 1340, and may access the Internet through the communicator 1340. For example, a processor 1320 of the radar data processing device 1300 may request and/or search the external server 1390 for data (e.g., radar scan image, feature data, and the like) corresponding to the identified surrounding environment (e.g., bridge, tunnel, and downtown area). The radar data processing apparatus 1300 may store the reference data 1331 received from the external server 1390 in a reference DB of a memory 1330. Thus, the radar data processing device 1300 may build a suitable or necessary reference DB to upscale radar data, for example, a radar scan image, adaptively through a web retrieval in response to the surrounding environment. In addition, the radar data processing device 1300 may update the reference data 1331 and a resolution increase model 1332 through communication with the external server 1390.

A sensor 1310 may further include other types of additional sensors in addition to a radar sensor. Examples of the other types of sensors will be described in detail with reference to FIG. 14.

Figure 14:
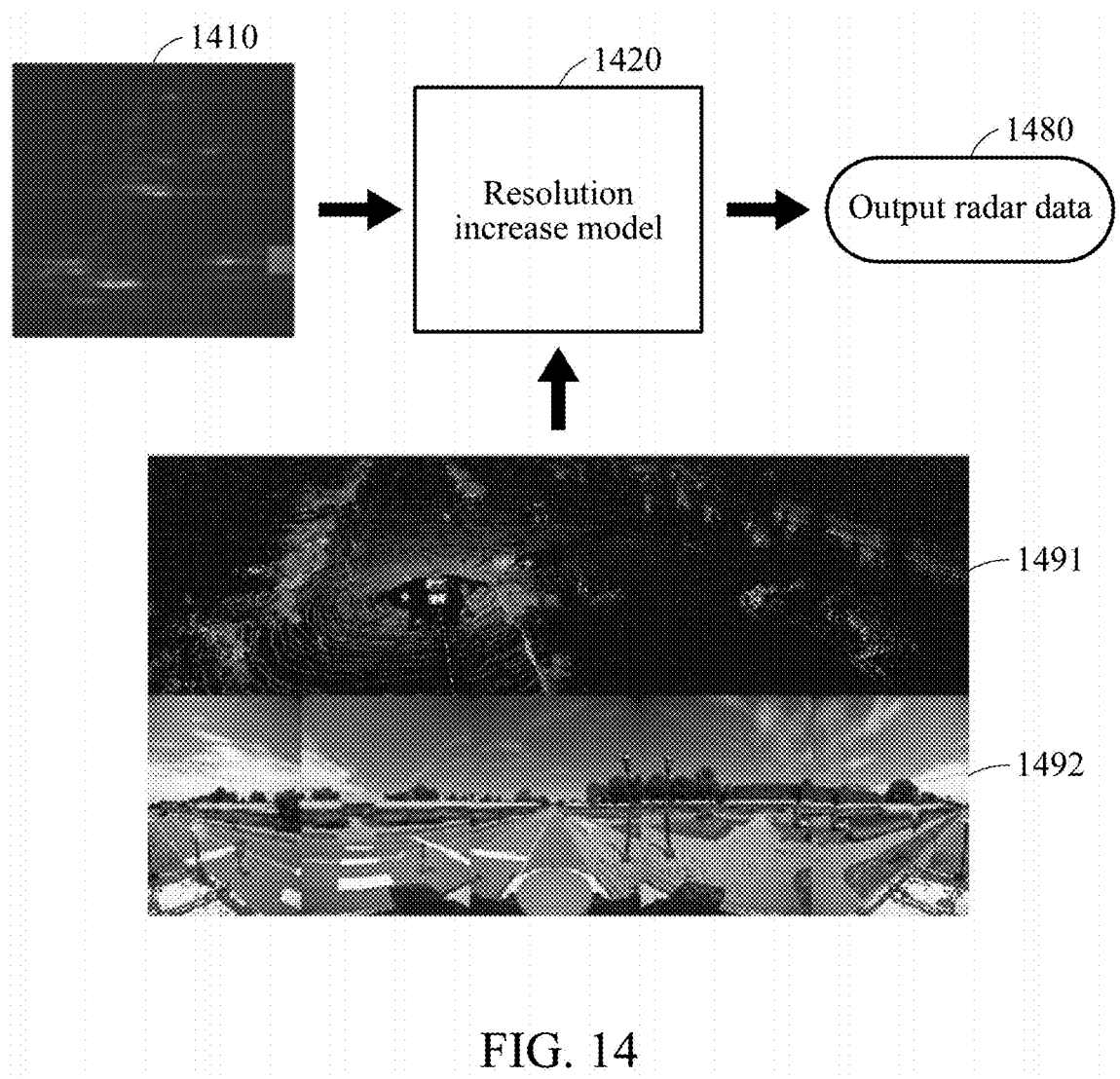
FIG. 14 illustrates an example of using, as additional reference data, additional information collected through various sensors, according to an embodiment.

FIG. 14 illustrates an example of using, as additional reference data, additional information collected through various sensors, according to an embodiment.

A radar data processing device may collect additional information through various sensors in addition to a radar sensor, and use the collected additional information as reference data. For example, the radar data processing device may obtain the reference data based on any one or any combination of any two or more of an infrared sensor, an image sensor, and a lidar sensor that is arranged based on a reference coordinate system that is common to the radar sensor. In the example of FIG. 14, a lidar image map 1491 corresponding to lidar data, and a camera image 1492 corresponding to camera data may be obtained as reference data. The radar data processing device may calibrate a radar sensor, a lidar sensor, and a camera sensor, and may thus unify coordinate systems of the sensors into the reference coordinate system. The radar data processing device may generate output radar data 1480 by applying, to a resolution increase model 1420, the lidar image map 1491 and the camera image 1492 in addition to input radar data 1410.

Figure 15:
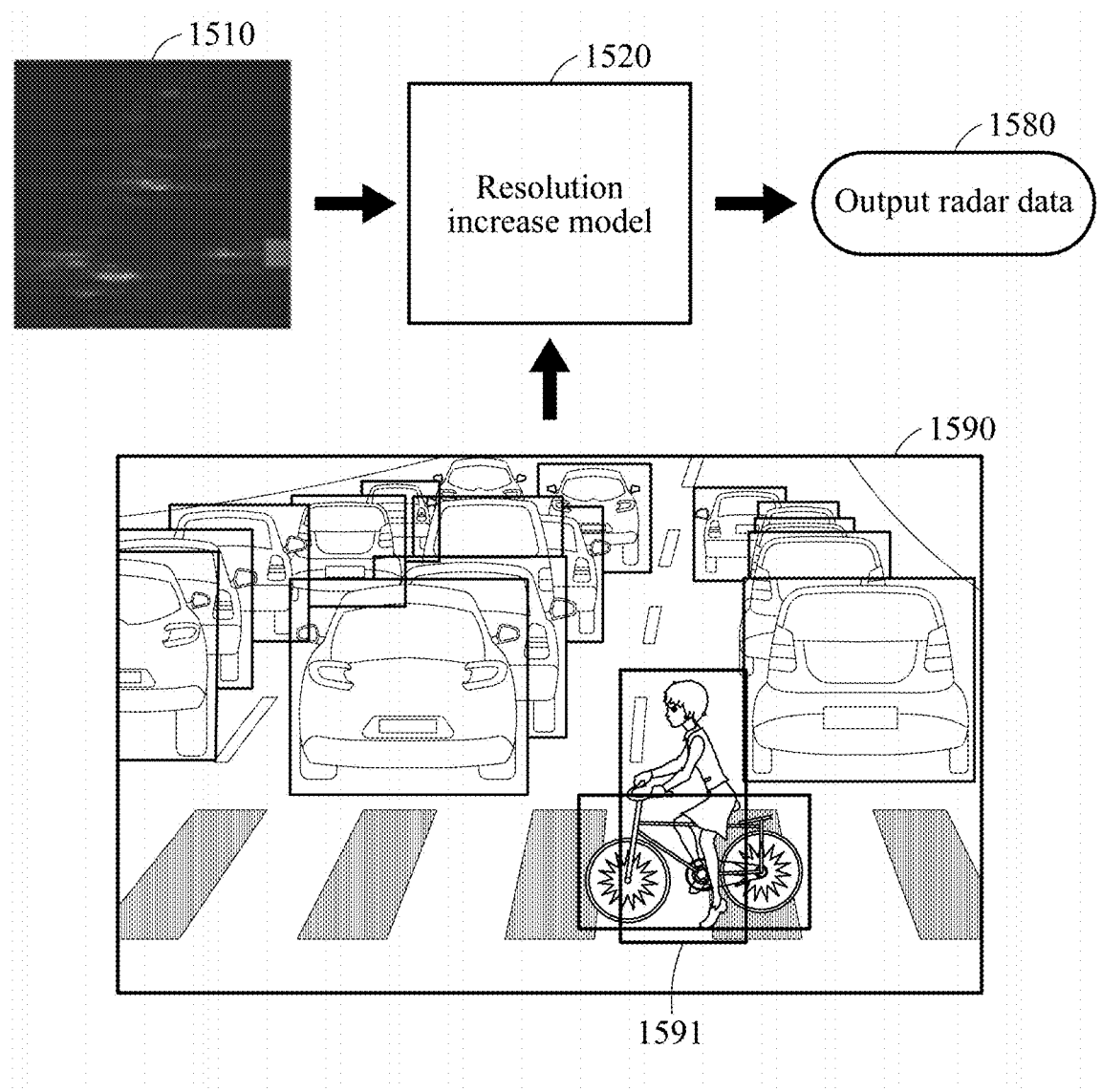
FIG. 15 illustrates an example of using, as additional reference data, a result of detecting an object based on the collected additional information of FIG. 14.

FIG. 15 illustrates an example of using, as additional reference data, a result of detecting an object based on the collected additional information of FIG. 14.

A radar data processing device may extract additional information from data obtained by various additional sensors described above with reference to FIG. 14, and use the extracted additional information.

For example, the radar data processing device may detect and classify an object from reference data. In the example of FIG. 15, the radar data processing device may obtain a camera image 1590 as reference data, and detect and classify an object from the camera image 1590. For example, the radar data processing device may calculate a coordinate of an object present around a vehicle and identify a type of the object, for example, a vehicle, a pedestrian, a traffic light, an obstacle, and the like.

The radar data processing device may generate output radar data 1580 from input radar data 1510 and the reference data, in addition to a result 1591 of detecting and classifying the object, using a resolution increase model 1520. As described above with reference to FIG. 14, sensors may be arranged based on a reference coordinate system, and thus the radar data processing device may generate higher-resolution output radar data 1580 using the result 1591 of object detection and classification from information other than radar data. This is because an object type, for example, a vehicle, a bicycle, and a human being, that is indicated by a signal reflected from a certain target point is given in the input radar data 1510. For example, through the resolution increase model 1520, the radar data processing device may generate the output radar data 1580 while giving a gain based on the object classification to a point at which the object is detected in the input radar data 1510.

Figure 16:
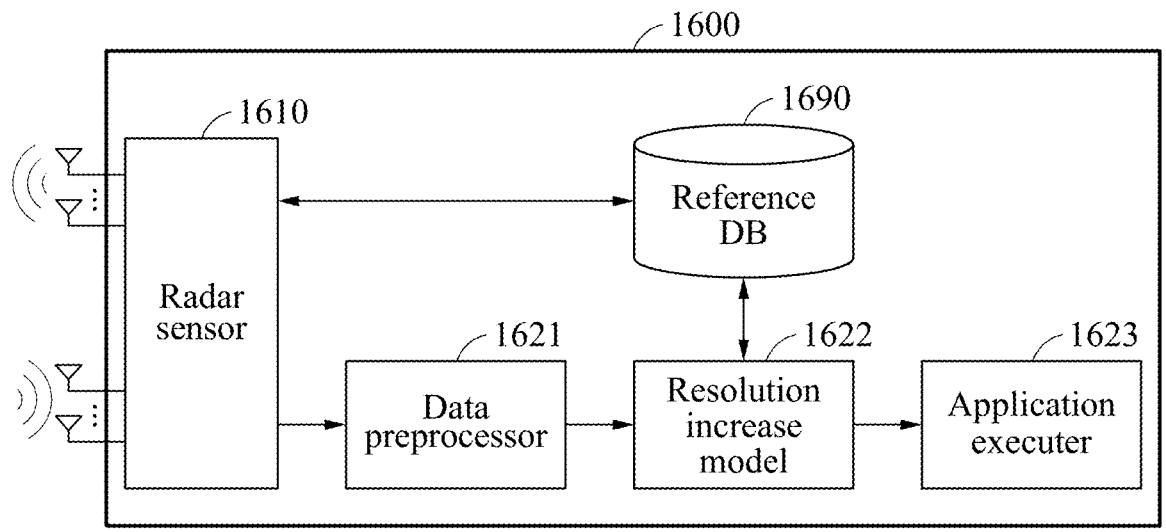
FIG. 16 illustrates an example of a radar data processing device implemented as a mobile application, according to an embodiment.

FIG. 16 illustrates an example of a radar data processing device 1600 implemented as a mobile application, according to an embodiment.

Referring to FIG. 16, the radar data processing device 1600 may be embodied in a mobile terminal. The radar data processing device 1600 may sense, as input radar data, radar data associated with at least a portion of a body of a user through a radar sensor 1610.

A data preprocessor 1621 of the radar data processing device 1600 may generate an input radar scan image by applying preprocessing to the input radar data. The radar data processing device 1600 may generate an output radar scan image from the input radar scan image by referring to a reference DB 1690, using a resolution increase model 1622.

An application executer 1623 of the radar data processing device 1600 may recognize one of a gesture, a body part, and an identity of the user, or a combination of two or more thereof, based on the output radar data, and indicate a result of the recognizing. For example, the application executer 1623 may perform an operation corresponding to the result of the recognizing, for example, unlocking a device, or visualize the result of the recognizing through a display.

The radar data processing device 1600 may obtain radar data through the radar sensor 1610 provided in the mobile terminal, and may also obtain image data using a camera sensor or an infrared sensor.

Figure 17:
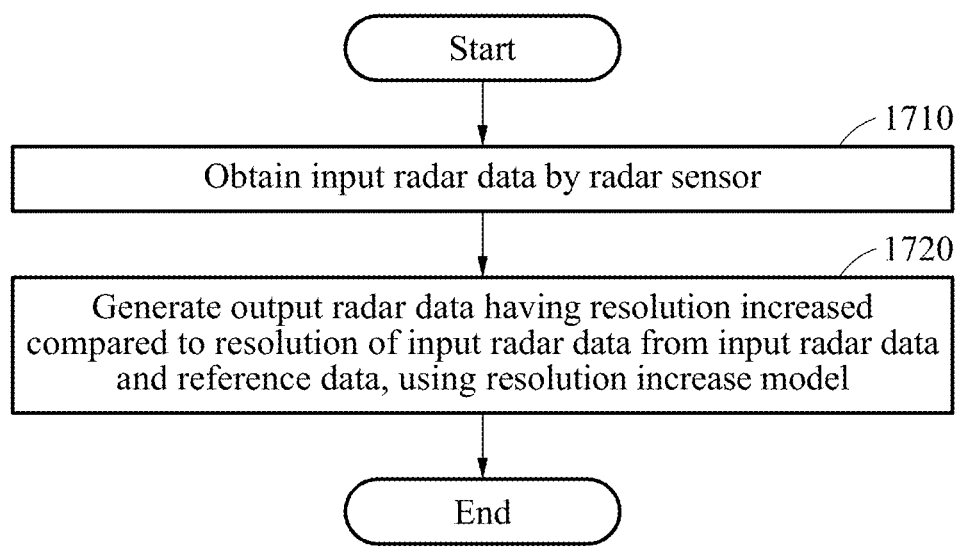
FIG. 17 illustrates an example of a radar data processing method, according to an embodiment.

FIG. 17 illustrates an example of a radar data processing method, according to an embodiment.

Referring to FIG. 17, in operation 1710, a radar data processing device obtains input radar data by a radar sensor. The radar data processing device may also collect other types of information through an additional sensor other than the radar sensor.

In operation 1720, the radar data processing device generates output radar data having a resolution increased compared to a resolution of the input radar data from the input radar data and reference data, using a resolution increase model.

In an example, the radar data processing device may generate high-resolution output radar data having a restored fine detail by applying, to the resolution increase model, the reference data along with the input radar data. The radar data processing device may restore more realistic output radar data by referring to rich textures and fine details that are present in the reference data. As described above, the radar data processing device may adaptively apply a high-resolution texture through the reference data to restore the high-resolution output data. Thus, it is possible to reduce an ill-posed issue when increasing a resolution.

However, the radar data processing method may not be limited to what has been described above with reference to FIG. 17, and may be performed along with one or more of operations described above with reference to FIGS. 1 through 16 in parallel or sequentially.

Figure 18:
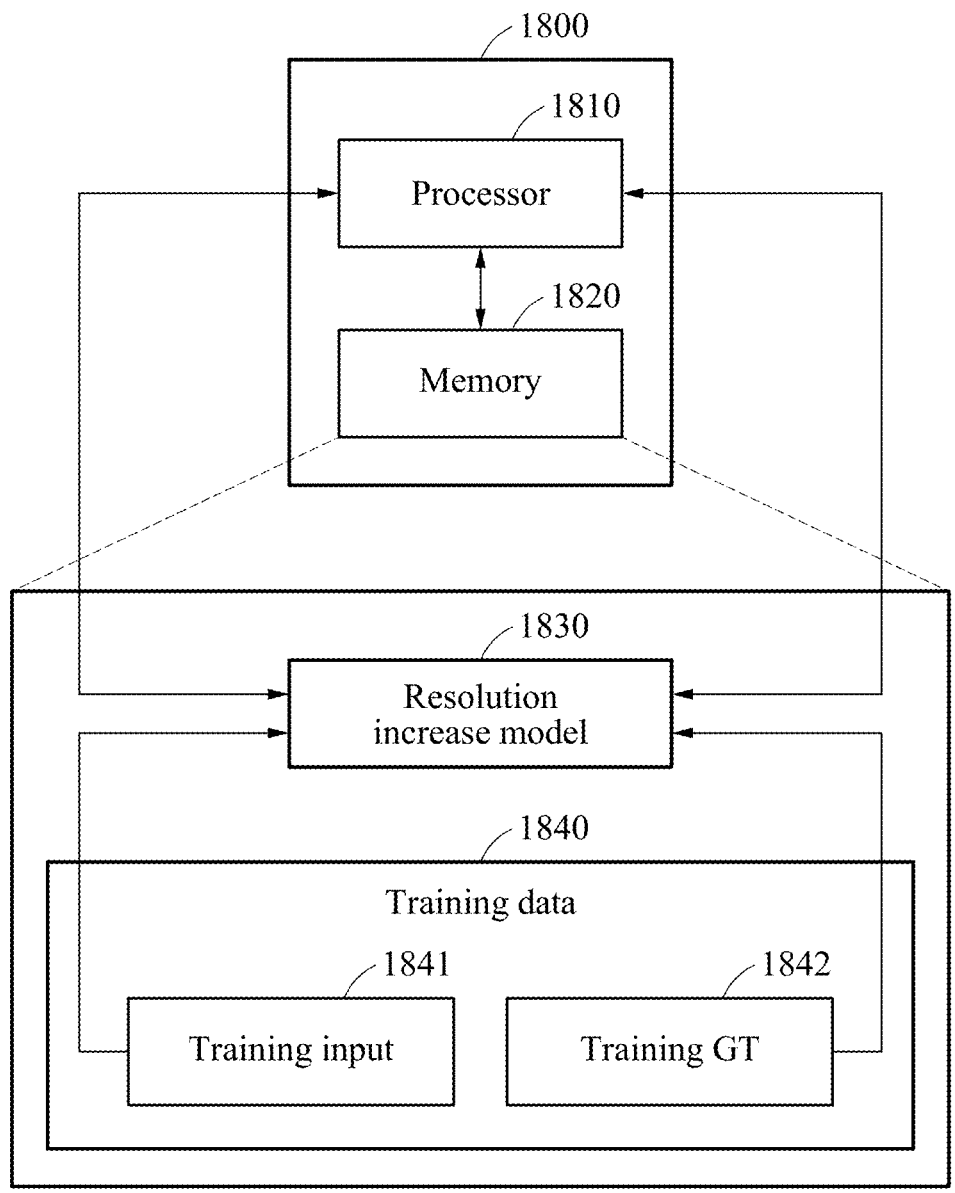
FIG. 18 illustrates an example of a training device, according to an embodiment.

FIG. 18 illustrates an example of a training device 1800, according to an embodiment.

Referring to FIG. 18, the training device 1800 includes, for example, a processor 1810 and a memory 1820.

The processor 1810 may generate a high-resolution training GT 1842 and a low-resolution training input 1841 from original raw radar data based on information associated with one of a plurality of dimensions that form the raw radar data. For example, the processor 1810 may select data to be used for training from the raw radar data, and generate the high-resolution training GT 1842 and the low-resolution training input 1841 by preprocessing the selected data. The processor 1810 may train a resolution increase model 1830 such that the high-resolution training GT 1842 is output from the low-resolution training input 1841 and reference data.

For example, the processor 1810 of the training device 1800 may train the resolution increase model 1830 based on the low-resolution training input 1841, the high-resolution training GT 1842, and the reference data. In this example, the training device 1800 may generate a temporary high-resolution output from the low-resolution training input 1841 and the reference data based on a temporary resolution increase model 1830. Here, the temporary resolution increase model 1830 may indicate the resolution increase model 1830 which is before the training is completed, and the temporary high-resolution output may indicate an output of the resolution increase model 1830 before the training is completed. The training device 1800 may calculate a loss between the temporary high-resolution output and the high-resolution training GT 1842 based on a predefined loss function. The training device 1800 may train the resolution increase model 1830 based on the loss obtained through the calculating. For example, the training device 1800 may update a parameter of the resolution increase model 1830 through, for example, backpropagation, such that the loss is minimized. However, a method of the training is not limited to the example described in the foregoing, and various training methods may be applied based on an architecture of a neural network. For example, the training described above with reference to FIG. 18 may be applied to the resolution increase models 400, 740, and 840 that are illustrated in FIGS. 4, 7, and 8, respectively, and the training described above with reference to FIG. 5 may be applied to the resolution increase model illustrated in FIG. 6.

The memory 1820 may store the resolution increase model 1830. In addition, the memory 1820 may temporarily or semi-permanently store a reference DB, training data 1840, and data needed to train the resolution increase model 1830. For example, the memory 1820 may store the temporary high-resolution output that is calculated from the training input 1841 and the reference data based on the resolution increase model 1830. The training data 1840 may include a pair of the training input 1841 and the training GT 1842. For example, the reference data used for the training may also be used to generate output radar data when the training is completed.

Figure 19:
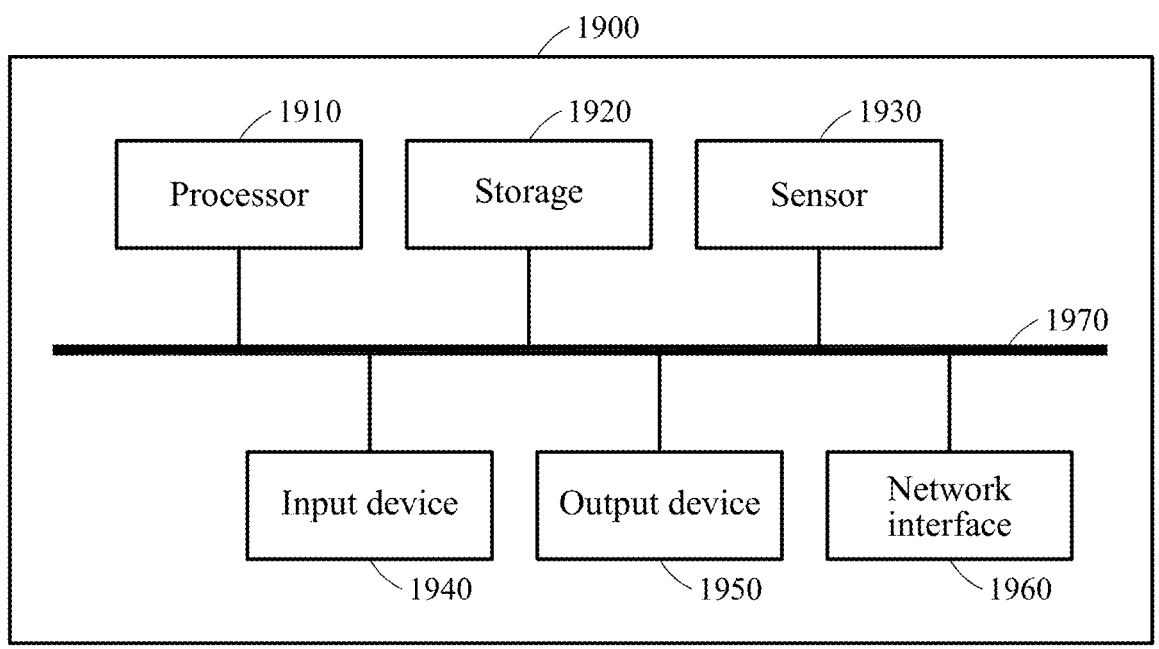
FIG. 19 illustrates an example of a radar data processing device, according to an embodiment.

FIG. 19 illustrates example of a radar data processing device 1900, according to an embodiment.

Referring to FIG. 19, the radar data processing device 1900 may be a computing device configured to process radar data using a radar data processing method described above. In an example, the computing device 1900 may correspond to the radar data processing device 200 described above with reference to FIG. 2. The computing device 1900 may be, for example, an image processing device, a smartphone, a wearable device, a tablet computer, a netbook, a laptop, a desktop, a personal digital assistant (PDA), a head-mounted display (HMD), a drone, a self-driving vehicle, or the like.

Referring to FIG. 19, the computing device 1900 includes, for example, a processor 1910, a storage 1920, a sensor 1930, an input device 1940, an output device 1950, and a network interface 1960. The processor 1910, the storage 1920, the sensor 1930, the input device 1940, the output device 1950, and the network interface 1960 may communicate with one another through a communication bus 1970.

The processor 1910 may execute functions and instructions in the computing device 1900. For example, the processor 1910 may process instructions stored in the storage 1920. The processor 1910 may perform one or more, or all, of operations described above with reference to FIGS. 1 through 18.

The storage 1920 may store information or data needed for the processor 1910 to process. The storage 1920 may include a non-transitory computer-readable storage medium, for example, a random-access memory (RAM), a dynamic RAM (DRAM), a static RAM (SRAM), a magnetic hard disk, an optical disc, a flash memory, an electrically erasable programmable read-only memory (EPROM), a floppy disk, and other types of computer-readable storage medium that are well-known in the related technical field. The storage 1920 may store instructions to be executed by the processor 1910, and store related information while software or an application is being executed by the computing device 1900.

The sensor 1930 may include various types of sensors including, for example, a lidar sensor, a camera sensor, and an infrared sensor, in addition to a radar sensor.

The input device 1940 may receive an input from a user through a tactile input, a video input, an audio input, or a touch input. The input device 1940 may include, for example, a keyboard, a mouse, a touchscreen, a microphone, and/or other devices that may detect the input from the user and transmit the detected input.

The output device 1950 may provide an output of the computing device 1900 to a user through a visual, auditory, or tactile channel. The output device 1950 may include, for example, a display, a touchscreen, a speaker, a vibration generator, and/or other devices that may provide the user with the output.

The network device 1960 may communicate with an external device through a wired or wireless network.

In an example, the output device 1950 may provide a user with a result of processing radar data using any one or any combination of any two or more of visual information, auditory information, and haptic information. For example, when the computing device 1900 is provided in a vehicle, the computing device 1900 may generate result data including any one or any combination of any two or more of a result of detecting an object present around a radar data processing device, a result of tracking the object, a result of recognizing the object, a nearby map, and an output scan image. The output device 1950 may visualize the result data through a display. For another example, the computing device 1900 may change any one or any combination of any two or more of a velocity, an acceleration, and steering of the vehicle in which the computing device 1900 is provided based on the result data obtained from the output radar data.

Although a sensor, for example, the sensor 1930, is mainly described herein as being a radar sensor, the sensor may also be embodied by a lidar sensor. In such a case, radar data described above with reference to FIGS. 1 through 18 may be replaced with lidar data. For example, a data processing device may obtain input lidar data through the lidar sensor, provide reference data in addition to the input lidar data to a resolution increase model, and generate output lidar data.

The radar data acquirers 210 and 911, the resolution increase models 220, 740, 840, 912, 1420, 1520, 1622, and 1830, the radar data processors 230 and 913, the chirp transmitter 311, the spectrum analyzer 316, the neural network 400, the generator models 540 and 640, the discriminator model 550, the high resolution data acquirer 921, the reference data selector 922, the central processor 1020, the processors 1320, 1810, and 1910, the memories 1330 and 1820, the communicator 1340, the external server 1390, the data processor 1621, the application executer 1623, the storage 1920, the network interface 1960, the communication bus 1970, the other processors, the other memories, and other components and devices in FIGS. 1 to 19 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 19 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, comprising:
   obtaining, by a radar sensor transmitting and receiving a radar signal, first radar data; and
   providing, as an input to a resolution increase machine learning model, the first radar data combined with reference data that is not derived from the radar sensor, wherein the resolution increase machine learning model to generates output radar data by performing an inference on the input,
   wherein the output radar data has a resolution greater than a resolution of the first radar data.

2. The method of claim 1, wherein the obtaining of the first radar data comprises generating, as the first radar data, an input radar image dependent on the received radar signal, and
   wherein the generating of the output radar data comprises:
      generating input data by concatenating, to the generated input radar image, a reference radar image as the reference data, the reference radar image having a resolution greater than a resolution of the input radar image; and
      generating, from the generated input data, an output radar image as the output radar data, using the resolution increase machine learning model.

3. The method of claim 1, wherein the reference data comprises second radar data obtained, before the first radar data is obtained, by another radar sensor having a resolution greater than a resolution of the radar sensor.

4. The method of claim 3, wherein the reference data further comprises third radar data obtained by an additional radar sensor having a field of view (FOV) overlapping at least a portion of a FOV of the radar sensor.

5. The method of claim 1, wherein the generating of the output radar data comprises:
   identifying an environment around a radar data processing device performing the method;
   obtaining environmental reference data corresponding to the identified environment from a reference database; and
   obtaining the reference data based on the environmental reference data.

6. The method of claim 5, wherein the obtaining of the environmental reference data comprises receiving the environmental reference data from an external database of the radar data processing device.

7. The method of claim 1, further comprising:
obtaining second radar data collected by another radar sensor; and
generating the reference data from the obtained second radar data,
wherein the radar sensor and the other radar sensor are disposed in a same moving object.

8. The method of claim 7, wherein the other radar sensor has a field of view (FOV) overlapping at least a portion of a FOV of the radar sensor.

9. The method of claim 7, wherein the obtained second radar data comprises data collected in a previous time frame, and sharing a FOV of the radar sensor and at least a portion of a scene in a current time frame.

10. The method of claim 7, wherein the obtained second radar data comprises data collected in a previous time frame, and including an object detected through the radar sensor in a current time frame.

11. The method of claim 1, further comprising:
obtaining the reference data based on any one or any combination of any two or more of an infrared sensor, an image sensor, and a light detection and ranging (lidar) sensor that is arranged based on a reference coordinate system common to the radar sensor.

12. The method of claim 11, wherein the obtaining of the reference data comprises detecting and classifying an object from the reference data, and
wherein the generating of the output radar data comprises generating the output radar data from the first radar data and the reference data along with a result of the classifying of the object, using the resolution increase machine learning model.

13. The method of claim 1, further comprising:
generating, based on the output radar data, result data including any one or any combination of any two or more of a detection result, a tracking result, a recognition result, a map of a surrounding area, and an output scan image,
wherein the detection result, the tracking result, the recognition result, the map, and the output scan image are associated with an object disposed adjacent to a radar data processing device performing the method.

14. The method of claim 13, further comprising:
visualizing the result data through a display.

15. The method of claim 1, further comprising:
changing, based on result data obtained from the output radar data, any one or any combination of any two or more of a speed, an acceleration, and a steering of a vehicle in which a radar data processing device performing the method is disposed.

16. The method of claim 1, wherein the obtaining of the first radar data comprises:
sensing, for the first radar data, radar data associated with at least a portion of a body of a user; and
indicating a recognition result of recognizing, based on the output radar data, any one or any combination of any two or more of a gesture of the user, a body part of the user, and an identity of the user.

17. A non-transitory computer-readable storage medium storing instructions that, when executed by a processor, cause the processor to perform the method of claim 1.

18. The method of claim 1, wherein the generating of the output radar data comprises:
extracting input feature data from the first radar data using a portion of layers of the resolution increase machine learning model; and
generating the output radar data from the extracted input feature data and reference feature data using another portion of the layers of the resolution increase machine learning model.

19. The method of claim 18, wherein the generating of the output radar data using the other portion of the layers comprises:
concatenating the reference feature data to the input feature data before the obtaining of the first radar data; and
generating, using the other portion of the layers of the resolution increase machine learning model, the output radar data from data in which the reference feature data and the input feature data are concatenated.

20. A method with radio detection and ranging (radar) data processing, comprising:
obtaining, by a radar sensor, input radar data; and
generating, using a resolution increase model, output radar from the input radar data and reference data, the reference data comprising a reference radar image or a feature map derived therefrom, wherein the reference radar image is not obtained by the radar sensor,
wherein the output radar data has a resolution greater than a resolution of the input radar data,
wherein the generating of the output radar data comprises:
extracting input feature data from the input radar data using a portion of layers of the resolution increase model; and
generating the output radar data from the extracted input feature data and reference feature data using another portion of the layers of the resolution increase model.

21. The method of claim 20, wherein the generating of the output radar data using the other portion of the layers comprises:
concatenating the reference feature data to the input feature data before the obtaining of the input radar data; and
generating, using the other portion of the layers of the resolution increase model, the output radar data from data in which the reference feature data and the input feature data are concatenated.

22. A device, comprising:
a radar sensor configured to obtain first radar data by transmitting and receiving a radar signal; and
a processor configured to generate, using a resolution increase machine learning model, output radar data by providing both the first radar data and reference data to the resolution increase machine learning model to generate the output radar by performing an inference on the first radar data and the reference data, wherein the reference data is not derived from the radar sensor,
wherein the output radar data has a resolution greater than a resolution of the first radar data.

23. A processor-implemented method, comprising:
implementing, by a processor, a resolution increase machine learning model provided first radar data, of a first resolution, for radar data received by a radar sensor;
generating, by the processor, output radar data of a second resolution based on the implementing,
wherein the second resolution is greater than the first resolution, and
wherein the resolution increase machine learning model is configured to consider the first radar data and reference data, which is predetermined prior to the implementing, to generate the output radar data.

* * * * *